United States Patent
Guo et al.

(10) Patent No.: US 12,424,209 B1
(45) Date of Patent: Sep. 23, 2025

(54) NATURAL LANGUAGE PROCESSING

(71) Applicant: Amazon Technologies, Inc., Seattle, WA (US)

(72) Inventors: Chenlei Guo, Redmond, WA (US); Xing Fan, Redmond, WA (US); Bharath Bhimanaik Kumar, Sammamish, WA (US); Kerry Hammil, Bainbridge Island, WA (US); Dinesh Malla, Sunnyvale, CA (US); Puyang Xu, Issaquah, WA (US); Sixing Lu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 246 days.

(21) Appl. No.: 18/362,632

(22) Filed: Jul. 31, 2023

(51) Int. Cl.
*G10L 15/183* (2013.01)
*G10L 15/30* (2013.01)

(52) U.S. Cl.
CPC ............ *G10L 15/183* (2013.01); *G10L 15/30* (2013.01)

(58) Field of Classification Search
None
See application file for complete search history.

(56) References Cited

U.S. PATENT DOCUMENTS

| | | | |
|---|---|---|---|
| 11,803,710 B1* | 10/2023 | Love | G06V 10/96 |
| 2022/0093089 A1* | 3/2022 | Chen | G10L 25/51 |

* cited by examiner

*Primary Examiner* — Quynh H Nguyen
(74) *Attorney, Agent, or Firm* — Pierce Atwood LLP

(57) ABSTRACT

Techniques for generating tasks to be completed in order to perform an action responsive to a user input and, for a given task, shortlisting available components to those that are relevant for the task are described. The system processes a user input to determine tasks to be completed in order to perform an action responsive to the user input. The system determines a priority of the tasks and selects a top-ranked task. The system determines descriptions of processing performable by components that are semantically similar to the current task, and requests a description of the function the corresponding components would perform for the current task. Based on the received descriptions, the system selects one or more components to perform the task. Thereafter, the system causes the action to be performed and outputs a response to the user input.

20 Claims, 10 Drawing Sheets

NATURAL LANGUAGE PROCESSING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
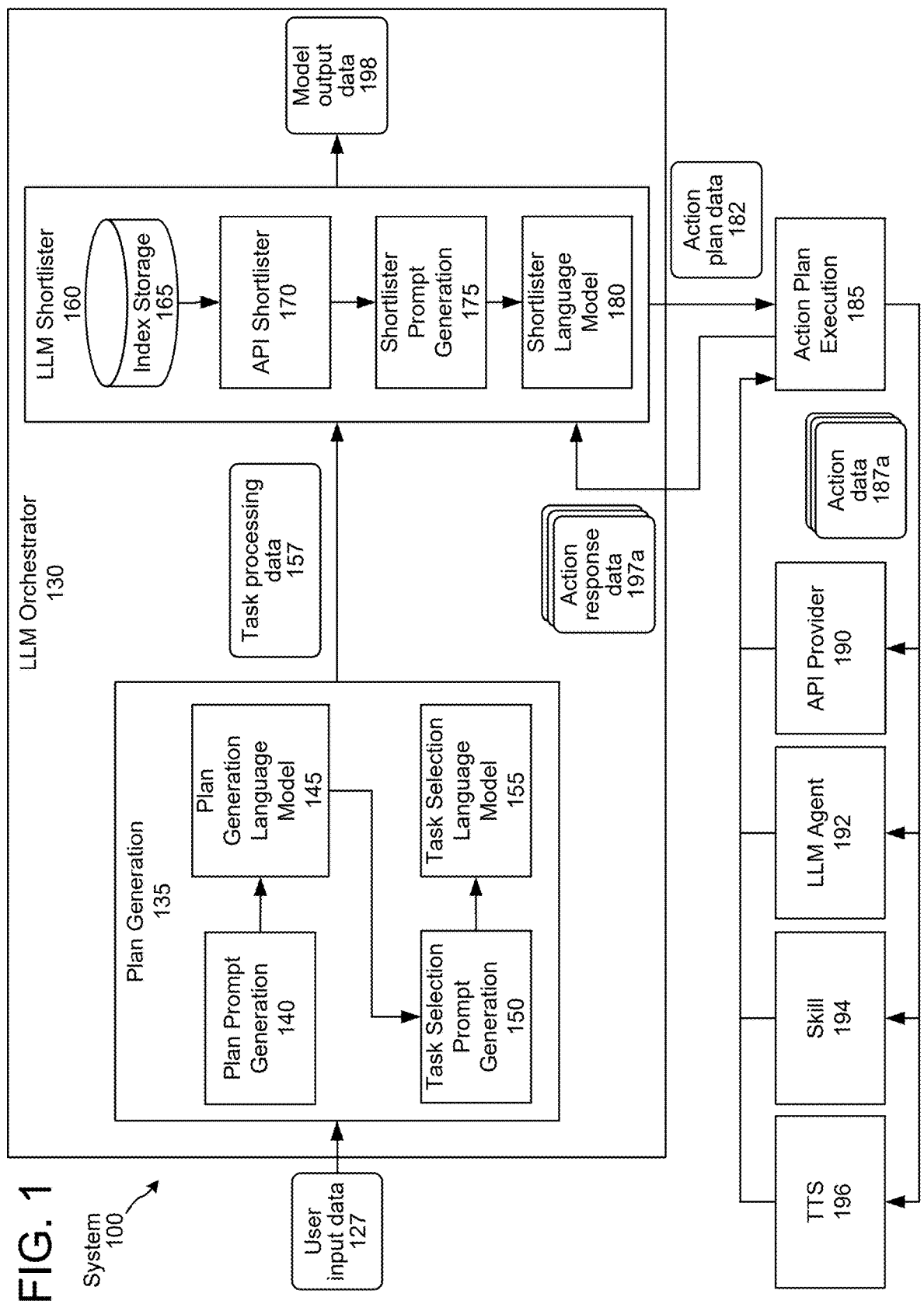
FIG. 1 is a conceptual diagram illustrating example components and processing for determining one or more components configured to perform an action associated with the task, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content. Language modeling (LM) is the use of various statistical and probabilistic techniques to determine the probability of a given sequence of words occurring in a sentence. LM can be used to perform various tasks including generative tasks that involve generating data rather than discriminating between given classes.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door," the system may actuate a "front door" smart lock to a locked position.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input.

In some instances, the system may be configured to process the ASR data using one or more language models (e.g., one or more large language models (LLMs)) to determine the action responsive to the user input. For example, in response to the user input "Please plan a 4-person trip to [Location] from [Date 1] to [Date 2]," the system may determine that the user wants to book a trip to [Location] during the specified dates. Thereafter, the system may use the language model(s) to generate one or more tasks (e.g., steps, sub-actions associated with main action (e.g., booking the trip), etc.) associated with booking the trip (e.g., (1) find a flight ticket from the user's location to [Location] leaving on [Date 1] and returning on [Date 2]; and (2) find a hotel in [Location] between [Date 1] and [Date 2]) and select a task of the one or more tasks to be performed first (e.g., (1) find a flight ticket leaving the user's location on [Date 1] and returning on [Date 2].) The system may determine one or more components (e.g., a skill component, a LLM agent component, etc.), etc.) configured to perform action(s) associated with a top-priority task of the one or more tasks and the language model(s) may generate an output indicating one or more requests (e.g., application programming interface (API) calls) that the one or more components return a description of the function(s) (e.g., action(s)) they are configured to/will perform with respect to the user input and/or current task. As used herein, an "API call" is an instruction/request for the corresponding API to perform a particular action (e.g., an API call of turn_on_device (device="indoor light 1") corresponds to an instruction/request to an API to turn on a device associated with the identifier "indoor light 1"). The system may execute the API calls and the language model(s) may determine that a first component (e.g., a travel booking website) of the one or more components is configured to perform a function (e.g., an action) responsive to the user input/task. The system may then perform as discussed herein above with respect to a next top-priority task (e.g., find a hotel in [Location] between [Date 1] and [Date 2]) of the one or more tasks. Thereafter, the language model(s) may determine that one or more components have been selected to perform the function(s) (action(s)) responsive to the user input, generate a response informing the user of the actions to be performed, and, with authorization, cause the one or more components to perform the function(s) (e.g., action(s)).

The present disclosure provides techniques for using one or more language models to determine one or more tasks to be completed in order to perform an action responsive to a user request, processing the one or more tasks according to a determined priority, and determine one or more components configured to perform an action responsive to the one or more tasks. The system may determine various personalized information for a user to the system, including dialog information (e.g., one or more previous user inputs and/or system-generated responses for a current interaction between the user and the system), user preferences, and user behavior information (e.g., information one or more typical behaviors associated with the user (e.g., user turns the outside lights on after 7 PM, user prefers [music streaming service 1], etc.). The system may use the personalized information to resolve any ambiguities in the input. The system may use the personalized information and the user input to generate, update, and prioritize a list of tasks to be completed in order to perform an action responsive to the input.

The system may select a top-priority task of the tasks to complete first. The system may determine one or more APIs capable of performing actions similar to the task. For example, the system may utilize historical user interaction data including previous inputs and the APIs used to perform corresponding actions. The system may select one or more relevant APIs to provide at least a description of the function(s) (e.g., action(s)) the API(s) is capable of performing with respect to the task. In some embodiments, the system may determine that there are one or more tasks remaining to be completed, in which case the system will perform a further iteration(s) of processing with respect to the remaining tasks. The system may determine whether the API-provided descriptions (or a system-generated summary of the descriptions) for the one or more tasks are responsive to the user input. If the system determines the API(s) are capable of performing the action responsive to the user input, the system may select APIs most capable of performing the tasks, provide a response to the user, and cause the APIs to perform the corresponding functions (e.g., actions). In some embodiments, the system may determine that clarifying information is necessary to complete a task and/or perform the action responsive to the input, in which case the system may query the user and/or another component of the system for the clarifying information and perform further iteration(s) of processing with respect to the user input/tasks and the clarifying information.

Teachings of the present disclosure provide, among other things, an improved user experience by providing a system capable of determining one or more tasks to be completed in order to perform the action responsive to the user input. This allows for the system to process user inputs requesting performance of potentially complicated actions (e.g., planning a 4-person trip to [Location] from [Date 1] to [Date 2]). Further, providing a system capable of prioritizing the tasks to be completed in order to perform the action responsive to the user input allows the system to complete tasks in a logical order, which may provide for more efficient processing in situations where completion of a first task requires prior completion of a second task. Even further, providing a system capable of determining one or more (e.g., top-k) components (e.g., APIs) to process with respect to the user input and/or tasks based on their relevance to the user input or tasks allows the system to narrow the number of components to be considered by the corresponding language model, which increases both the efficiency and accuracy of the language model.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 including a large language model (LLM) orchestrator component 130 and various other components for determining an action responsive to a user input. The system 100 may further include an action plan execution component 185, an API provider component 190, an LLM agent component 192, a skill component 194, and a TTS component 196. The LLM orchestrator component 130 may include a plan generation component 135 and an LLM shortlister component 160. In some embodiments, the action plan execution component 185 may be included in the LLM orchestrator component 130. The plan generation component 135 may further include a plan prompt generation component 140, a plan generation language model 145, a task selection prompt generation component 150, and a task selection language model 155, further details of which are described below in relation to FIG. 2. The LLM shortlister component 160 may further include an index storage 165, an API shortlister component 170, a shortlister prompt generation component 175, and a shortlister language model 180, further details of which are described below in relation to FIG. 3.

Language modeling (LM) is the use of various statistical and probabilistic techniques to determine the probability of a given sequence of words occurring in a sentence. Language models analyze bodies of text data to provide a basis for their word predictions. The language models 145, 155, 180 are generative models. In some embodiments, the language models 145, 155, 180 may be a LLM. An LLM is an advanced artificial intelligence system designed to process, understand, and generate human-like text based on massive amounts of data. An LLM model may be built using deep learning techniques, such as neural networks, and may be trained on extensive datasets that include text (or other type of data) from a broad range of sources, such as books and websites, for natural language processing. An LLM uses an expansive training dataset, as compared to a language model, and can include a large number of parameters (in the range of billions), hence, they are called "large" language models. In some embodiments one or more of the language models 145, 155, 180 (and their corresponding operations, discussed herein below) may be the same language model.

In some embodiments where one or more of the language models 145, 155, 180 are LLMs, the one or more language models 145, 155, 180 may be transformer-based seq2seq models involving an encoder-decoder architecture. In an encoder-decoder architecture, the encoder may produce a representation of an input text using a bidirectional encoding, and the decoder may use that representation to perform some task. In some such embodiments, one or more of the language models 145, 155, 180 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the one or more language models 145, 155, 180 may be pre-trained for approximately 1 trillion tokens. Being trained on CLM tasks, the one or more language models 145, 155, 180 may be capable of in-context learning. An example of such a LLM is Alexa Teacher Model (Alexa™).

In other embodiments, where one or more of the language models 145, 155, 180 are an LLM, the one or more language models 145, 155, 180 may be a decoder-only architecture. The decoder-only architecture may use left-to-right (unidirectional) encoding of the input text. An example of such a LLM is the Generative Pre-trained Transformer 3 (GPT-3) and other versions of GPT. GPT-3 has a capacity of (approximately) 175 billion machine learning parameters.

Other examples of LLMs include BigScience Large Open-science Open-access Multilingual Language Model (BLOOM), Language Model for Dialogue Applications model (LaMDA), Bard, Large Language Model Meta AI (LLaMA), Titan Foundational Model, etc.

In some embodiments, the system may include one or more machine learning model(s) other than one or more of the language models 145, 155, 180. Such machine learning model(s) may receive text and/or other types of data as inputs, and may output text and/or other types of data. Such model(s) may be neural network-based models, deep learning models, classifier models, autoregressive models, seq2seq models, etc.

In embodiments where one or more of the language models 145, 155, 180 are an LLM, the input to the LLM may be in the form of a prompt. A prompt may be a natural language input, for example, an instruction, for the LLM to generate an output according to the prompt. The output generated by the LLM may be a natural language output responsive to the prompt. The prompt and the output may be text in a particular language (e.g., English, Spanish, German, etc.). For example, for an example prompt "how do I cook rice?", the LLM may output a recipe (e.g., a step-by-step process) to cook rice. As another example, for an example prompt "I am hungry. What restaurants in the area are open?", the LLM may output a list of restaurants near the user that are open at the time.

The language models 145, 155, 180 may be configured using various learning techniques. For example, in some embodiments, the language models 145, 155, 180 may be configured using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the language models 145, 155, 180 may be configured using one-shot learning, which is similar to few-shot learning, except the model is provided with a single example. As another example, in some embodiments, the language models 145, 155, 180 may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

In some embodiments, the LLM orchestrator component 130 may generate prompt data representing a prompt for input to the language models 145, 155, 180. As shown in FIG. 1, the LLM orchestrator component 130 receives user input data 127. In some instances, the user input data 127 may correspond to a text or tokenized representation of a user input. For example, the user input data 127 may include input text (or tokenized) data when the user input is a typed natural language user input. For further example, prior to the LLM orchestrator component 130 receiving the user input data 127, another component (e.g., an automatic speech recognition (ASR) component 550) of the system 100 may receive audio data representing the user input. The ASR component 550 may perform ASR processing on the audio data to determine ASR data corresponding to the user input, which may correspond to a transcript of the user input. As described below, with respect to FIG. 5, the ASR component 550 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 550 level of confidence that the corresponding hypothesis represents what the user said. The ASR component 550 may also determine token scores corresponding to each token/word of the ASR hypothesis, where the token score indicates the ASR component's 550 level of confidence that the respective token/word was spoken by the user. The token scores may be identified as an entity score when the corresponding token relates to an entity. In some instances, the user input data 127 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 127).

In some embodiments, the LLM orchestrator component 130 may receive input data, which may be processed in a similar manner as the user input data 127 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the user device 110, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a user device 110 (e.g., a smartphone, a smart speaker, etc.) to present an alert to the user. The LLM orchestrator component 130 may process the input data to generate tasks that may cause the foregoing example actions to be performed.

Figure 2:
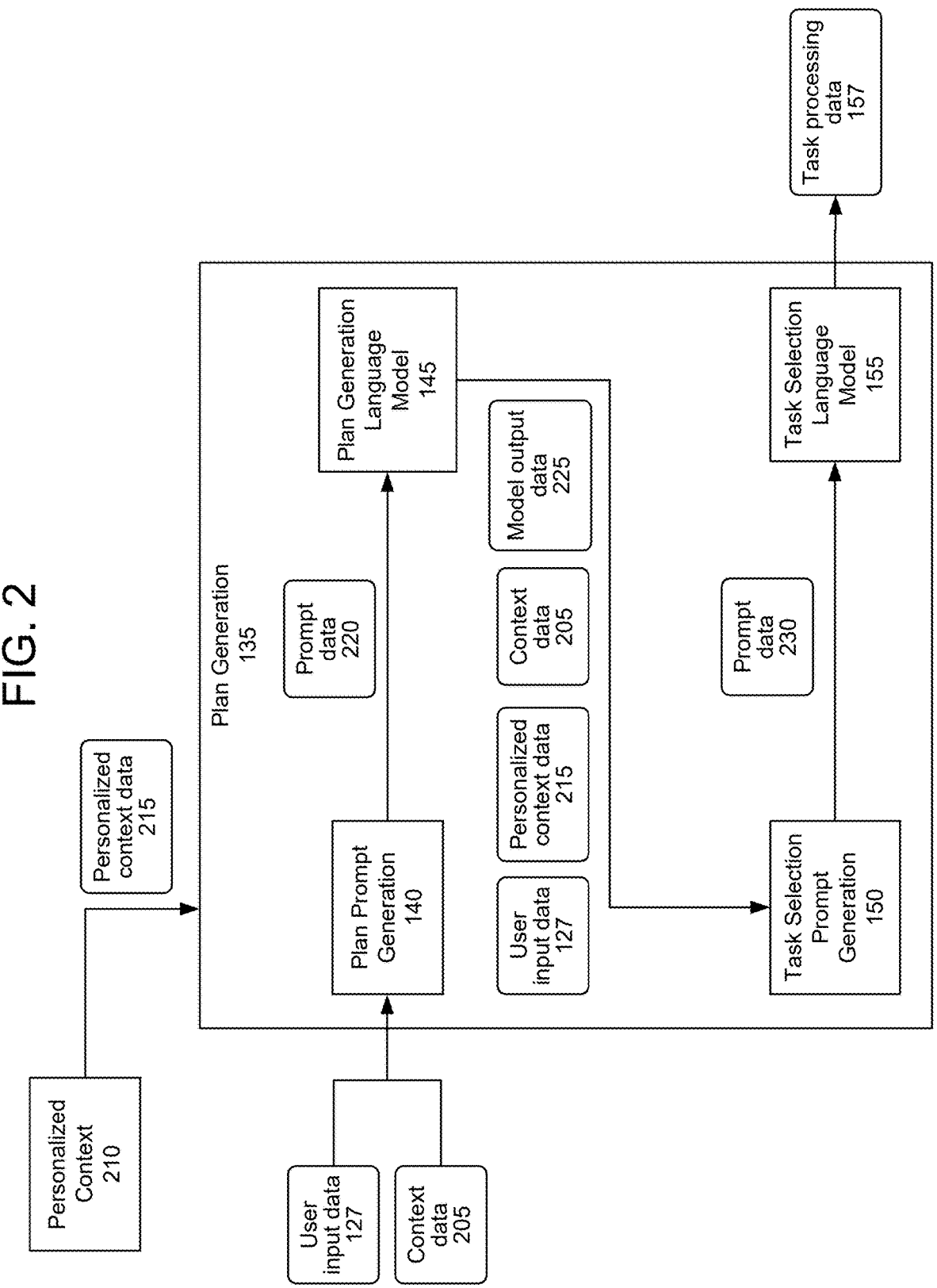
FIG. 2 is a conceptual diagram illustrating example processing of a plan generation component, according to embodiments of the present disclosure.

As illustrated in FIG. 1, the user input data 127 may be received by the LLM orchestrator component 130 at the plan generation component 135, which may be configured to generate (e.g., using the plan generation language model 145) a list (e.g., one or more) of tasks (e.g., steps/sub-actions) that are to be completed in order to perform an action responsive to the user input and select (e.g., using the task selection language model 155) a task of the list of the tasks that is to be completed first (e.g., in a current iteration of processing by the system 100), as described in detail herein below with respect to FIG. 2. As used herein, a "task" is a step/sub-action associated with performance of an action responsive to a user input. For example, as discussed herein above, in order to perform an action responsive to a user input of "Please plan a 4-person trip to [Location] from [Date 1] to [Date 2]," the system 100 may determine that performance of the action (e.g., booking the trip to [Location]) requires completion of the task (e.g., steps, sub-actions) of (1) find a flight ticket from the user's location to [Location] leaving on [Date 1] and returning on [Date 2]; and (2) find a hotel in [Location] between [Date 1] and [Date 2]).

In instances where the plan generation component 135 (e.g., using the plan generation language model 145) generates more than one task to be completed in order to perform the action responsive to the user input, the plan generation component 135 may further maintain and prioritize the list of tasks as the processing of the system 100 with respect to the user input is performed. In other words, as the system 100 processes to complete the list of tasks, the plan generation component 135 may (1) incorporate the results of the processing performed to complete the tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The plan generation component 135 may generate and send task processing data 157 representing the selected task to be completed and various other information needed to perform further processing with respect to the task (e.g., the user input data 127, an indication of the selected task, results of processing performed for previous tasks, the remaining task(s), and context data associated with the user input data 127, as described in detail herein below with respect to FIG. 2) to the LLM shortlister component 160.

The LLM shortlister component 160 may be configured to determine one or more components (e.g., APIs, skill component(s) 194, LLM agent component(s) 192, TTS component 196, etc.) configured to perform an action related to the user input or the current task. The LLM shortlister component 160 may further be configured to generate and cause the execution of a request(s) (e.g., an API call(s)) for the one or more components to provide an output(s) such as a description(s) representing the function(s) (e.g., action(s)) the components are configured to/will perform with respect to the user input or the current task. Such requests may be represented in the action plan data 182 sent to the action plan execution component 185. The action plan execution component 185 may identify the request(s) in the action plan data 182 and cause the corresponding components (e.g., the API provider component 190, the LLM agent component 192, the skill component 194, and/or the TTS component 196) to generate action response data 197a-n representing the requested output(s), where individual action response data 197a may be provided by/correspond to a particular responding component—one of the API provider component 190, the LLM agent component 192, the skill component 194, and/or the TTS component 196. In some embodiments, the action response data 197a-n may include an identifier (e.g., a component name, an alphanumerical value associated with the component, etc.) for the component providing the data. The LLM shortlister component 160 receives and processes the action response data 197a-n and generates model output data 198 representing the output(s) (e.g., relevant outputs, selected outputs, ranked outputs, etc.) for further processing (e.g., as described in detail herein below with respect to FIGS. 3-4).

FIG. 2 illustrates example processing of the plan generation component 135. As shown in FIG. 2, the user input data 127 is received at the plan prompt generation component 140. The plan prompt generation component 140 processes the user input data 127 to generate prompt data 220 representing a prompt for input to the plan generation language model 145. In some embodiments, the plan prompt generation component 140 may further receive an indication of one or more remaining tasks to be completed with respect to the user input data 127. For example, if the current iteration of processing with respect to the user input data 127 is a subsequent iteration of processing (e.g., the system previously determined that more than one task is to be completed in order to perform an action responsive to the user input data 127 and has previously performed at least a first task of the more than one tasks), then the plan prompt generation component 140 may further receive an indication of the remaining tasks to be completed. In such embodiments, the plan prompt generation component 140 may further receive an indication of the completed task(s) and/or result(s) of the processing performed to complete the task(s). The plan prompt generation component 140 may further receive context data 205 representing various contextual signals associated with the user input data 127, such as weather information, time of day, device information associated with the device that sent the user input data 127 (e.g., device ID, device states, historical device interaction data, etc.). Such prompt data 220 may be generated based on combining the user input data 127 and the context data 205 (and, in some embodiments, the indication of the remaining task(s), completed task(s), and/or the results of the processing performed to complete the task(s)). In some embodiments, the prompt data 220 may be generated further based on personalized context data 215 representing one or more contextual signals associated with a user that provided the user input, such as information associated with a user profile of the user (e.g., user ID, user behavioral information, user preferences, age, gender, historical user interaction data, devices associated with the user profile, etc.), which may be determined using, for example, a user recognition component 595. In some embodiments, an indication of the user and/or user profile may be included in the user input data 127 (e.g., as included in the output of the ASR component 550.). In some embodiments, the personalized context data 215 may include dialog history data representing one or more user inputs and corresponding system-generated responses for a current interaction between the user and the system 100.

As used herein, a "dialog" may refer to multiple related user inputs and system 100 outputs (e.g., through user device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The plan prompt generation component 140 may receive the personalized context data 215 from a personalized context component 210. The personalized context component 210 may be configured to determine and return contextual information associated with a user input to the plan prompt generation component 140, which the plan prompt generation component 140 may combine with the user input data 127 to generate the prompt data 220. In some embodiments, the personalized context component 210 may query various components and/or storages (e.g., the profile storage 570) for the contextual information. In some embodiments, the personalized context component 210 may include a storage including one or more portions of the contextual information. In other embodiments, the personalized context component 210 may be/implement an LLM. In such embodiments, the personalized context component 210 may be finetuned on personalized information for one or more users, as is discussed in more detail herein below. Further, in such embodiments, the personalized context component 210 (or the system 100) may include a personalized context prompt generation component (not illustrated), which may be configured to generate a prompt including the user input data 127 (or a representation of an intent of the user input) to be input to the LLM. The prompt may be an instruction for the LLM to determine one or more portions of context data (e.g., the personalized context data 215) associated with the prompt.

The personalized context component 210 may be caused to generate and return the personalized context data 215 based on the system 100 determining that clarifying information is needed in order to complete a task associated with a user input. For example, one or more of the components of the system 100 (e.g., the plan generation language model 145, the task selection language model 155, the shortlister language model 180, the response arbitration component 470) may determine that an ambiguity exists in the user input (or the data determined/generated as a result of processing with respect to the user input). In such examples, the personalized context component 210 may receive the user input, the current task, and/or model output data indicating that an ambiguity exists/clarifying information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 210 may process as described herein above to generate the personalized context data 215 (e.g., "The user prefers [Music Streaming Service 1].")

In some embodiments, plan prompt generation component 140 (or another component of the system 100) may process the context data 205, the personalized context data 215, the user input data 127, and/or the result of processing performed to complete a task associated with the user input data 127 to generate a natural language representation of the user input (represented by the user input data 127) that is updated to include the contextual information of the personalized context data 215 (e.g., a contextual rewrite of the user input). Thereafter, the plan prompt generation component 140 may process to generate the prompt data 220 using the updated user input data.

In some embodiments, the prompt data 220 may be an instruction for the plan generation language model 145 to determine one or more tasks (e.g., steps/actions) that are to be completed in order to perform an action responsive to the user input given the other information (e.g., the personalized context data 215, the indication of the remaining task(s), the indication of the completed task(s), and/or the corresponding response(s)) included in the prompt data 220.

In some embodiments, the plan prompt generation component 140 may also include in the prompt data 220 a sample processing format to be used by the plan generation language model 145 when processing the prompt. In some embodiments, the plan prompt generation component 140 may generate the prompt data 220 according to a template format. For example, the prompt data 220 may adhere to a template format of:
{
  Create a new task if necessary to help complete a request to [user input data 127 (or a representation of a determined intent of the user input data 127].
  Here are the completed tasks, their results, user inputs, and context so far:
  [completed tasks, results of processing performed to complete the tasks, dialog history, context data 205, personalized context data 215]
  These are the remaining tasks to be completed:
  [remaining task data]
  Based on the result, create new tasks to be completed, if necessary.
  Return the tasks as an array.
}

In some embodiments, the template format may instruct the plan generation language model 145 as to how it should process to generate the one or more tasks (e.g., steps) that are to be completed in order to perform the action responsive to the user input. In some embodiments, the format may further include an indication, such as a label of "User:" indicating the following string of characters/tokens as the user input. In some embodiments, the format may further include a label of "Thought:" instructing the plan generation language model 145 to generate an output representing the determined interpretation of the user input by the plan generation language model 145 and/or an action that should be taken (e.g., the user is requesting [intent of the user input], the user is trying to [intent of the user input], need to determine [information needed to properly process the user input] etc.) In some embodiments, the format may further include an indication of "Observation:" indicating the following string of characters/tokens as the result of performance of an action determined by the plan generation language model 145/the plan generation language model 145's interpretation of the result of the performance of the action determined by the plan generation language model 145 (e.g., the completed tasks and/or their results). In some embodiments, the format may further include an indication of "Response:" instructing the plan generation language model 145 to generate a response (e.g., one or more tasks to be completed to perform an action responsive to the user input) to the prompt.

Following such a template format, for example, and for a user input of "turn on all of the lights except the garage," the plan prompt generation component 140 may generate example prompt data 220a:
{
Create a new task if necessary to help complete a request to turn on all of the lights except the garage.
Here are the completed tasks, their results, user inputs, and context so far:
[ ]
These are the remaining tasks to be completed:
[ ]
Based on the result, create new tasks to be completed, if necessary.
Return the tasks as an array.
}

As an example of a user input that is associated with more than one task, the system 100 may receive a user input of "please order some pizza for dinner" and may determine a task list of "identify user pizza preference" and "find application that enables ordering of pizza." Thereafter, the system 100 may process as described herein below to select and complete the task of "identify user pizza preference." The plan prompt generation component 140 may process the user input, corresponding context data, the remaining task list, and results of processing performed with respect to previous tasks (e.g., the users pizza preference, determined, for example, by the personalized context component 210) to generate example prompt data 220a:
{
Create a new task if necessary to help complete a request to order some pizza for dinner.
Here are the completed tasks, their results, user inputs, and context so far:
Completed tasks:
Identify user pizza preference: user ordered Brooklyn style pizza from [Company name]
These are the remaining tasks to be completed:
Find application to order pizza
Based on the result, create new tasks to be completed, if necessary.
Return the tasks as an array.
}

In some embodiments, the plan prompt generation component 140 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 220 may include "Please generate a polite, respectful, and safe response and one that does not violate protected class policy."

The plan generation language model 145 processes the prompt data 220 to generate model output data 225 representing one or more predicted tasks to be completed in order to perform the action responsive to the user input. For example, based on processing the first example prompt data provided above, the plan generation language model 145 may output model output data: {"turn on all of the lights except the garage light,"} or the like. For further example, as discussed above, based on processing prompt data corresponding to the user input "please order some pizza for dinner" the plan generation language model 145 may output model output data: {"identify user pizza preference;" "find application that enables ordering of pizza," or the like. After the first task of "identify user pizza preference" is complete, and based on processing the second example prompt data provided above, the plan generation language model 145 may further output model output data: {"find an application to order pizza" "find API to order [Company name] pizza,"} or the like. In some embodiments, the threshold for determining the one or more tasks may be such that the plan generation language model 145 is encouraged to generate multiple predicted tasks for a given user input, where the system 100 may parse and filter the list of tasks during downstream processing (e.g., during the processing of the task selection language model 155). For example, based on processing the first example prompt data provided above, the plan generation language model 145 may output model output data: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like.

The model output data 225 is sent to the task selection prompt generation component 150, which processes the model output data 225 to generate prompt data 230 representing a prompt for input to the task selection language model 155. In some embodiments, such prompt data 230 may be generated based on combining the user input data 127, the context data 205, the personalized context data 215, the prompt data 220, and/or the model output data 225. In some embodiments, the plan generation component 135 may include another component that parses the model output data 225 to determine the one or more tasks and may send a representation of the one or more tasks to the task selection prompt generation component 150.

In some embodiments, the prompt data 230 may be an instruction for the task selection language model 155 to select a task of the one or more tasks that is to be completed first (e.g., completed during the current iteration of processing) given the information (e.g., user input data 127, the personalized context data 215, and the one or more tasks) included in the prompt data 230. In some embodiments, the prompt data 230 may further include an instruction for the task selection language model 155 to determine a priority of the one or more tasks (e.g., an ordered list representing the order in which the one or more tasks are to be completed). As discussed above, with respect to the plan prompt generation component 140, in some embodiments, the task selection prompt generation component 150 may also include in the prompt data 230 a sample processing format to be used by the task selection language model 155 when processing the prompt. Similarly, in some embodiments, the task selection prompt generation component 150 may generate the prompt data 230 according to a template format, such as:

{
Select the top prioritized task given the ultimate goal of [user input data 127 (or a representation of a determined intent included in the user input data 127]
Here are the completed tasks, their results, and user inputs so far: [completed tasks, results of processing performed to complete the tasks, dialog history, context data 205, personalized context data 215]
Here are the task candidates:
[remaining tasks]
Return your selected task, return None if the goal is achieved or indicate existing ambiguities.
}

In some embodiments, the template format may instruct the task selection language model 155 as to how it should process to select the task and/or prioritize the one or more tasks. In some embodiments, as discussed above, the format may further include indications of the "User:", "Thought:", "Action:", "Observation:", and/or "Response:" indicators.

Following such a template format, for example, and for the first example user input provided above of "turn on all of the lights except the garage," the task selection prompt generation component 150 may generate example prompt data 230*a*:

{
Select the top prioritized task given the ultimate goal of turn on all of the lights except the garage
Here are the completed tasks, their results, user inputs, and context so far:
[ ]
Here are the task candidates:
Turn on all of the lights except the garage light
Return your selected task, return None if the goal is achieved or indicate existing ambiguities.
}

For further example, for the second example user input provided above of "please order some pizza for dinner," the task selection prompt generation component 150 may generate example prompt data 230*a*:

{
Select the top prioritized task given the ultimate goal of please order some pizza for dinner
Here are the completed tasks, their results, user inputs and context so far:
Completed tasks:
   Identify user pizza preference: user ordered Brooklyn style pizza from [Company name]
Here are the task candidates:
find an application that sells pizza
find API that sells [Company name] pizza
Return your selected task, return None if the goal is achieved or indicate existing ambiguities.
}

In some embodiments, the task selection prompt generation component 150 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 155 processes the prompt data 230 to generate model output data representing the task to be completed first and/or a prioritization of the one or more tasks. For example, based on processing the first example prompt data provided above, the task selection language model 155 may output model output data: {"1. Turn on all of the lights except the garage light,"} or the like. For further example, based on processing the second example prompt data provided above, the task selection language model 155 may output model output data: {"1. Find an API that sells [Company name] pizza,"} or the like. In some embodiments, during processing of the task selection language model 155 to select and/or prioritize the one or more tasks, the task selection language model 155 may update the task list to remove any redundant and/or conflicting tasks. For example, for the second example prompt data, the task selection language model 155 may determine that the remaining tasks of "find an application that sells pizza" and "find an API that sells [Company name] pizza" are redundant, and that "find an API that sells [Company name] pizza has a higher priority. Therefore, the task selection language model 155 may remove the task of "find an application that sells pizza" from the remaining task list. Thereafter, the plan generation component 135 (or another component of the plan generation component 135) may process the model output data of the task selection language model 155 to determine task processing data 157 representing the user input data 127, the context data 205, the personalized context data 215, and/or the task selected by the task selection language model 155 to be completed first. In some embodiments, the task processing data 157 may include the remaining one or more tasks and/or may indicate the prioritization of the one or more tasks, as determined by the task selection language model 155. The task processing data 157 may be sent to the LLM shortlister component 160, which is described in detail herein below with respect to FIG. 3.

Figure 3:
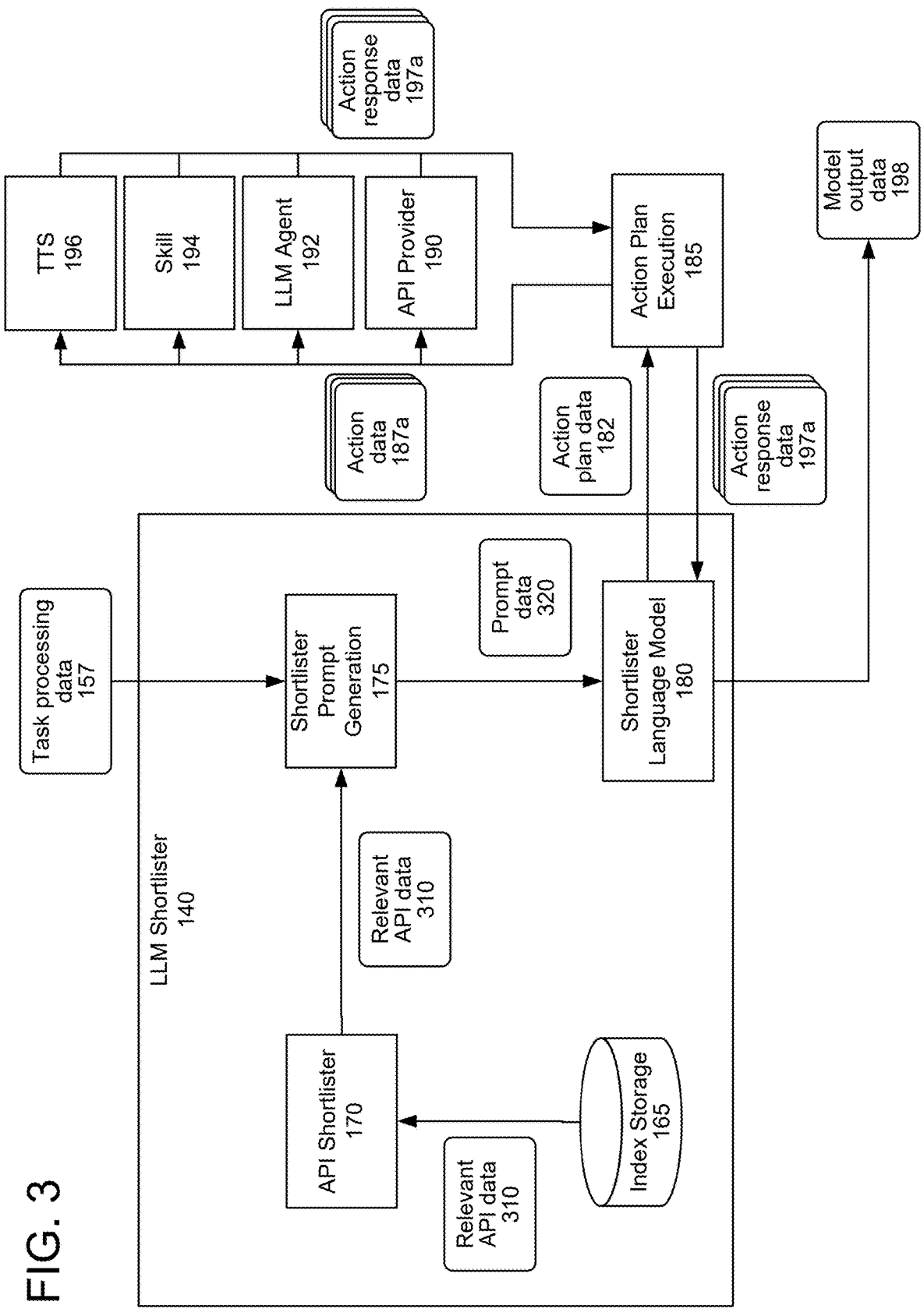
FIG. 3 is a conceptual diagram illustrating example processing of an LLM shortlister, according to embodiments of the present disclosure.

FIG. 3 illustrates example processing of the LLM shortlister component 160. As shown in FIG. 3, the task processing data 157 is received at the shortlister prompt generation component 175. The shortlister prompt generation component 175 processes the task processing data 157 to generate prompt data 320 representing a prompt for input to the shortlister language model 180. In some embodiments, such prompt data 320 may be generated based on combining the task processing data 157 (e.g., the user input data 127, the selected task, remaining tasks, results from processing performed to complete one or more previous tasks, etc.) and relevant API data 310 representing one or more APIs associated with the user input data 127 and/or the current task.

The relevant API data 310 may be generated by the API shortlister component 170, which may be configured to retrieve one or more (e.g., top-k) relevant APIs associated with the user input data 127 or the current task. In some embodiments, the APIs may correspond to various components. For example, the components may correspond to rule-based components, ML-based components, LLM-based components, or the like, such as personalized context component 210, skill component(s) 194, LLM agent component(s) 192, TTS component 196, the orchestrator component 530, etc.) In some embodiments, the APIs may correspond to the components.

The API shortlister component 170 may use retrieval-based approaches to retrieve the one or more relevant APIs from the index storage 165, which may store various information associated with multiple APIs such as API descriptions, API arguments (e.g., parameter inputs/outputs), identifiers for components (e.g., such as personalized context component 210, skill component(s) 194, LLM agent component(s) 192, TTS component 196) that provides the API, etc. For example, the API shortlister component 170 may compare one or more APIs included in the index storage 165 to the user input or the current task to determine one or more APIs (top-k) that corresponds to the user input or the current task (e.g., APIs that are semantically similar to the user input or the current task, APIs that are capable of performing the current task (or a function similar to the current task), etc.). In some embodiments, the API shortlister component 170 (or another component of the API shortlister component 170) may determine an encoded representation of the user input or the current task and compare (e.g., using cosine similarity) the encoded representation(s) to an encoded representation of an API description for the API to determine whether the API is semantically similar to the user input or the current task. An API description may correspond to a description of the one or more functions (e.g., actions) that the API is configured to perform and/or other information associated with the API (e.g., an API call formatting structure (e.g., including input parameters), historical accuracy/defect rate, historical latency value, etc.). In some embodiments, the API description may further include one or more exemplars associated with use of the API (e.g., an example user input, corresponding API call, and example API output). If the value of semantic similarity meets or exceeds a threshold, the API (and, optionally, the API description) may be included in the relevant API data 310. In some embodiments, the API shortlister component 170 may determine the relevant API data 310 further using contextual information, including the context data 205, the personalized context data 215, an accuracy/defect rate value associated with the APIs, and/or a historical latency value associated with the APIs (e.g., which may be included in the description of the API). In some embodiments, the index storage 165 may be included in the API shortlister component 170. Similar processing may be performed to determine one or more components that are semantically similar to the user input or the current task, which may be included in the relevant API data 310. The API retrieval may send the relevant API data 310 to the shortlister prompt generation component 175.

In some embodiments, the prompt data 320 may be an instruction for the shortlister language model 180 to determine one or more APIs that are to process with respect to the user input or the current task (e.g., determine one or more API calls to cause the APIs to process) given the information (e.g., the user input data 127, the context data 205, the personalized context data 215, the current task, and the relevant API data 310). As discussed above, with respect to the plan prompt generation component 140 and the task selection prompt generation component 150, in some embodiments, the shortlister prompt generation component 175 may also include in the prompt data 320 a sample processing format to be used by the shortlister language model 180 when processing the prompt. Similarly, in some embodiments, the shortlister prompt generation component 175 may generate the prompt data 320 according to a template format, such as:

{
You are an AI agent to find and execute an API to complete the task of [Task]
Here are a list of relevant API available:
[relevant API]
Use the following format:
Thought: think about what to do
API: API calls compatible with the task
Observation: the result of the API call
Summary: summarized results from the API call
If no appropriate API is found, summarize as nothing is found.
}

Following such a template format, for example, and for a selected task of "turn on all of the lights except the garage light" and corresponding relevant API data, the shortlister prompt generation component 175 may generate example prompt data 320a:

{
You are an AI agent to find an execute an API to complete the task of turn on all of the lights except the garage light
Here are a list of relevant API available:
Let's chat API
Classic NLU API
Smart Home skill
Use the following format:
Thought: think about what to do
API: API calls compatible with the task
Observation: the result of the API call
Summary: summarized results from the API call
If no appropriate API is found, summarize as nothing is found.
}

In some embodiments, the shortlister prompt generation component 175 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 180 processes the prompt data 320 to generate one or more API calls corresponding to request(s) that the corresponding APIs return a description of a function(s) that the APIs are configured to/will perform with respect to the user input and/or the current task. As such, in some embodiments, the shortlister language model 180 may generate API calls for a subset of the APIs represented in the prompt data 320. The shortlister language model 180 may generate the one or more APIs calls (including the required input parameters) by applying in-context learning for cold-starting APIs (e.g., one-shot/few-shot learning). For example, in embodiments where the relevant API data 310 includes the API descriptions, the shortlister language model 180 may use the one or more exemplars included in the API descriptions (included in the prompt data 320) to determine the one or more input parameters for the API call. In some embodiments, the shortlister language model 180 may be finetuned on such exemplars (e.g., during offline or runtime processing), such that the shortlister language model 180 is capable of determining the one or more input parameters for the given API call.

During processing of the shortlister language model 180 and after generating the one or more API calls, the shortlister language model 180 may cause the one or more API calls to be executed. For example, as shown in FIG. 3, the shortlister language model 180 may send action plan data 182 representing the one or more API calls to the action plan execution component 185, which causes execution of the one or more API calls included in the action plan data 182. For example, the action plan execution component 185 may process the action plan data 182 to generate action data 187a-n. Action data 187a may represent, for example, an instruction (e.g., an API call determined from the action plan data 182) for a particular API to process with respect to the user input and/or the current task. In some embodiments, the action plan execution component 185 may generate the action data 187*a-n* to represent an instruction to provide the description of the function performable/to be performed with respect to the user input and/or the current task.

The action plan execution component 185 may send the action data 187*a-n* to the API provider component 190 (and/or the LLM agent component 192, the skill component 194, the TTS component 196, the orchestrator component 530). The API provider component 190 may include one or more components (e.g., rule-based components, ML-based components, LLM-based components, or the like) that may be caused to process using the action data 187*a-n* (e.g., using the API calls generated by the LLM shortlister component 160). Example components that may be included in the API provider component 190 are discussed herein below with respect to FIG. 4.

The API provider component 190 (and/or the LLM agent component 192, the skill component 194, the TTS component 196) may send action response data 197*a-n* representing one or more responses generated by the one or more APIs corresponding to the action data 187*a-n* (e.g., the descriptions of the functions performable by the APIs with respect to the user input and/or the current task) to the action plan execution component 185. For example, in response to an API call to the skill component 194 associated with a user input for turning on a light, the action data 187*a* may correspond to "turn on the light," "turn_on_device ("light", [device ID])", or the like. For further example, in response to an API call to the skill component 194 associated with a user input for ordering a pizza from a particular restaurant, the action data 187*b* may correspond to "order medium pizza from [restaurant name]", "order_pizza ("medium", "pizza", "[restaurant name]")", or the like. The action plan execution component 185 may send the action response data 197*a-n* to the shortlister language model 180.

In some embodiments, the shortlister language model 180 may process the action response data 197*a-n* to generate a natural language summary of the action response data (e.g., the model output data 198). In some embodiments, the model output data 198 may include an association between action response data 197*a* (or a summarized representation of the action response data 197*a*) and an indication of the API/component that generated the action response data 197*a* (e.g., a component identifier, API description, etc.). In some embodiments, the shortlister language model 180 may be configured to filter and/or rank the action response data 197*a-n* based on how relevant the action response data 197*a-n* is to the current task. In some embodiments, the shortlister language model 180 may be configured to filter and/or rank the action response data 197*a-n* based on a confidence level of the component that provided the action response data, where the confidence level may indicate a likelihood of the component being able to respond (e.g., within a period of time), the component being able to perform an action that corresponds to the current task, etc. In some embodiments, the action response data 197*a-n* may indicate whether or not the corresponding component is able to respond (e.g., the action response data 197*a* may include a Boolean value such as "yes" or "no" or other similar indications). In some embodiments, the shortlister language model 180 may filter and/or rank the action response data 197*a-n* based on information included in the prompt data 320 (e.g., the user input data 127, the relevant API data 310, the context data 205, the personalized context data 215, the prompt data 220, etc.) For example, the model output data 198 may include a subset of the action response data 197*a-n* (or the summarized representations of the action response data 197*a-n*) and may further include a representation of a confidence associated with the action response data 197*a* (or a summarized representation of the action response data 197*a*). As such, the model output data 198 may further include data representing a confidence of how relevant the action response data 197*a* is to the current task. In some embodiments, the shortlister language model 180 may consider a rating associated with the component that provided the action response data 197*a*, where the rating may be a user satisfaction rating provided by multiple different users of the system 100, a user satisfaction rating provided by the user 105 associated with the user input data 127, a system generated rating based on the number of past tasks handled by the component, a accuracy rating based on the number of past tasks the component had handled correctly/provided a desired response for, etc.

The LLM shortlister component 160 may send the model output data 198 for further processing. In instances where the plan generation component 135 determined that more than one task is to be completed in order to perform the action responsive to the user input data 127, the LLM shortlister component 160 may send the model output data 198 to the plan generation component 135, which may process as described herein above to maintain and prioritize the task list based on the model output data 198 and select a new task to be completed. In instances where the plan generation component 135 determined that only one task is to be completed, or in instances where the LLM shortlister component 160 determines that there are no remaining tasks to be completed, the LLM shortlister may send the model output data 198, and the results of processing performed with respect to the previously completed tasks (e.g., previous action response data) to the response arbitration component 470, which is discussed in detail herein below with respect to FIG. 4). The LLM shortlister component 160 may further send the user input data 127, the context data 205, the personalized context data 215, etc., to the plan generation component 135 and/or the response arbitration component 470.

In some embodiments, the LLM orchestrator component 130 may further include a memory storage (not illustrated) which may store various information associated with the processing performed (e.g., user input data 127, the prompt data 220, the context data 205, the personalized context data 215, the model output data 225, prompt data 230, the task processing data 157, the relevant API data 310, the prompt data 320, the action plan data 182, the action response data 197*a-n*, the model output data 198, etc.) during one or more previous iterations of processing by the LLM orchestrator component 130 for the user input data 127. As such, after the LLM shortlister component 160 generates the model output data 198, the LLM orchestrator component 130 may send the abovementioned data to the memory storage. In some embodiments, the above-mentioned data may be sent to the memory storage as it is generated by the system 100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the plan prompt generation component 140 may receive one or more portions of the data included in the memory storage (which were generated during one or more previous iterations of processing performed with respect to the user input data 127) and include the one or more portions of data in the prompt data 220.

As discussed herein above, the shortlister language model 180 may be configured to determine whether additional information is needed in order to complete the current task (e.g., if an ambiguity exists in the user input data 127 or the current task, if the current task is to resolve an identified ambiguity, if an API argument is missing from the user input or other available data, etc.), in which case the shortlister language model 180 may send data representing a request for such additional information to the response arbitration component 470. In some embodiments, the action plan data 182 may represent the request for additional information, and the action plan execution component 185 may be configured to send corresponding action data 187a to the personalized context component 210. For example, for the example provided herein above with respect to ordering pizza, the shortlister language model 180 may determine that in order to resolve an ambiguity with respect to the user input data 127 or current task (e.g., based on the current task being to resolve the ambiguity or a determination that the current task cannot be completed due to the ambiguity), the system 100 must "identify user pizza preference," or the like. The system 100 may send a request to the personalized context component 210 to "identify user pizza preference" and the personalized context component 210 may process as described herein above to return personalized context data resolving the ambiguity (e.g., the user's pizza preference may be determined to be a cheese pizza or a pepperoni pizza). In some embodiments, where the action plan data 182 represents the request for additional information, the action plan execution component 185 may be configured to cause generation of output data corresponding to the request, which may be output to the user by the system 100. For example, the action plan execution component 185 may cause the TTS component 196 to process action data corresponding to the request to generate output audio data corresponding to the request. Thereafter, the system 100 may cause the output audio data to be output to the user (e.g., via a user device 110).

Figure 4:
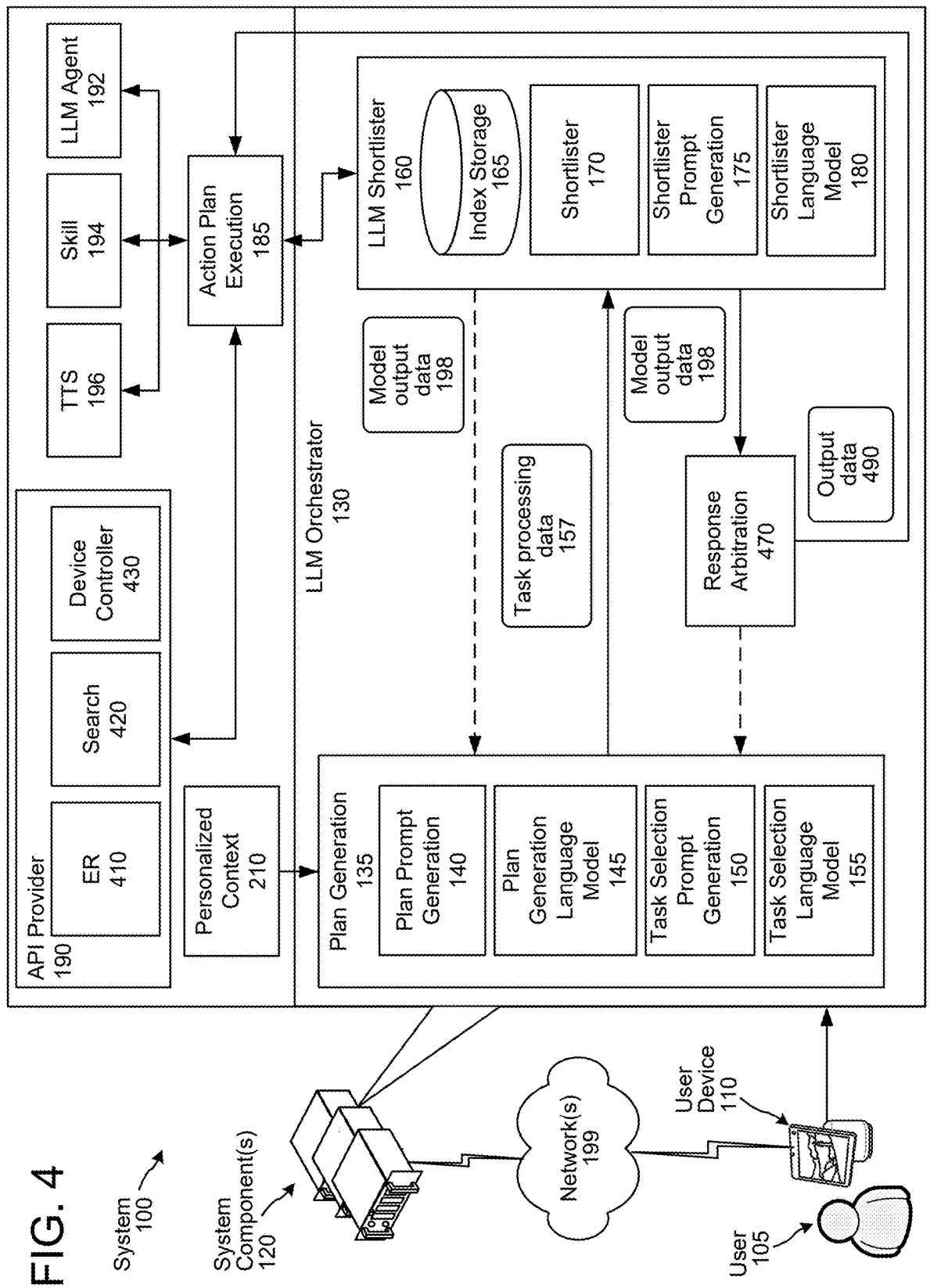
FIG. 4 is a conceptual diagram illustrating further example components and processing of the system for determining one or more components configured to perform an action associated with the task, according to embodiments of the present disclosure.

FIG. 4 illustrates further example components and processing of the system 100 for generating one or more tasks to be completed in order to perform an action responsive to a user input, prioritizing the one or more tasks, selecting a current task, and determining one or more relevant components configured to perform the task. As shown in FIG. 4, the system 100 may further include the user device 110, local to a user 105, in communication with a system component(s) 120 via a network(s) 199. The network(s) 199 may include the Internet and/or any other wide- or local-area network, and may include wired, wireless, and/or cellular network hardware.

The system component(s) 120 may include various components, such as the LLM orchestrator component 130, the action plan execution component 185, the API provider component 190, and the response arbitration component 470. In some embodiments, the response arbitration component 470 may exist in the system 100 outside of the LLM orchestrator component 130. As shown in FIG. 4, the system 100 may process as described herein above with respect to FIGS. 1-3 to generate one or more tasks to be completed in order to perform an action responsive to a user input, select a task to be completed first, and determine one or more natural language descriptions of actions performable by one or more APIs that are relevant to the user input and/or the current task.

As discussed herein above, the system 100 may include the TTS component 196, which may be configured to process textual or tokenized input to generate audio data representing synthesized speech corresponding to the textual or tokenized input spoken by a synthetic voice. The processing of the TTS component 196 is discussed in detail below with respect to FIG. 5.

The LLM agent component 192 may correspond to one or more LLM agents. An LLM agent component 192 may correspond to a custom instantiation of an LLM (and other components) that is configured to handle user inputs relating to a particular domain/functionality. In some embodiments, the LLM agent component 192 may be configured to handle specific use cases via particular prompt generation, fine-tuning of the LLM, etc. For example, the LLM agent component 192a may be configured to handle user inputs/tasks related to information query, the LLM agent component 192b may be configured handle user inputs/tasks related to shopping, the LLM agent component 192c may be configured to handle user inputs/tasks related to ordering food from various restaurants, the LLM agent component 192d may be configured to handle user inputs/tasks related to ordering food from a particular restaurant (e.g., a particular pizza restaurant), the LLM agent component 192e may be configured to handle user inputs/tasks related to booking a hotel, the LLM agent component 192f may be configured to handle user inputs/tasks related to booking a flight, etc.

The skill component 194 may be software running on the system component(s) 120 that is akin to a software application. That is, a skill component 194 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 194. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 194 may operate in conjunction between the system component(s) 120 and other devices, such as the user device 110, in order to complete certain functions. A skill component 194 may include hardware, software, firmware, or the like that may be dedicated to a particular skill component 194 or shared among different skill components 194.

As further shown in FIG. 4, the API provider component 190 may include various components that may be caused to execute using the action data 187a-n. For example, the API provider component 190 may include an entity recognition (ER) component 410, which may be configured to process textual or tokenized input to link one or more entity references included in the textual or tokenized input to a specific corresponding entity known to the system 100. For example, based on the textual or tokenized input (e.g., a context of the textual or tokenized input), the ER component 410 may determine that a reference to "Neil Armstrong" is directed to the American astronaut. In some embodiments, the action data 187*a*-*n* may include an indication(s) (e.g., slots) of one or more entities included in the user input, as determined by one or more of the language models 145, 155, 180, in which case the ER component 410 may process to link the one or more entities to the specific, referenced, entity known to the system 100.

In other embodiments, the ER component 410 may be configured to process the action data 187*a*-*n* to determine the one or more entities included in the user input and link the one or more determined entities to the specific, referenced, entity (entities) known to the system 100. For example, the ER component 410 may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component 410 links a slot of text data to a specific entity known to the system. To perform entity resolution, the ER component 410 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 190 may include a search component 420, which may be configured to query a storage (e.g., a database, repository, knowledge base, etc.) for information usable for generating a response to a user input. For example, if the action data 187*a*-*n* represents a request for information of "Who won the game between [Team 1 Name] and [Team 2 Name]," then the search component 420 may query the storage (or other sources, such as the Internet), to retrieve the information "[Team 1 Name] won the game between [Team 1 Name] and [Team 2 Name].".

As an even further example, the API provider component 190 may include a device controller component 430, which may be configured to cause a device to perform an action corresponding to the action data 187*a*-*n*. For example, if the action represented by action data 187*a* is to turn on a living room light (e.g., "turn_on_device (device="living room light")), then the device controller component 430 may identify the corresponding living room light, and instruct the living room light to power on (e.g., change its state to {state: ON}).

In some embodiments, the API provider component 190 may include a domain service component (not illustrated), which may be configured for interacting with one or more services defined by particular users, such as developers, specialists, or the like (e.g., to receive information, such as responses or annotations, to cause an action to be performed, etc.).

As further shown in FIG. 4, the LLM shortlister component 160 may send the model output data 198 to the response arbitration component 470. The response arbitration component 470 processes the model output data 198 to determine whether completion of the one or more tasks by the system 100 results in performance of the action responsive to the user input. In other words, the response arbitration component 470 processes the model output data 198 (representing the actions to be performed in response to the user input) and selects one or more of the actions to be output to the user, generates a natural language summary of one or more of the actions, and/or determines that none of the actions are responsive to the user input. For example, the response arbitration component 470 may process the model output data 198 to determine if one or more of the actions performable by the API(s) (e.g., represented by the natural language descriptions) are responsive to the current task. If the response arbitration component 470 determines that none of the actions are responsive to the user input, then the response arbitration component 470 may send an instruction to the personalized context component 210 to generate clarifying information for the user input. Additionally, or alternatively, the response arbitration component 470 may generate a natural language question to be output to the user requesting the clarifying information. In such instances, the system 100 (e.g., the plan generation component 135, the LLM shortlister component 160, and/or the response arbitration component 470) may process as described herein with further respect to the clarifying information (e.g., the personalized context data or the user-provided clarifying information) to perform the action responsive to the user input.

If the response arbitration component 470 determines that one or more of the actions are responsive to the user input, the response arbitration component 470 may generate output data 490 representing the one or more actions, or a natural language summary of the one or more actions, to be output to the user. In some embodiments, the response arbitration component 470 may send the output data 490 to the action plan execution component 185 along with an instruction requesting that action plan execution component 185 cause the API(s) to perform the actions corresponding to the one or more actions. Thereafter, the action plan execution component 185 may cause the API(s) to perform the actions corresponding to the one or more actions. In other embodiments, the system 100 may not generate and/or send the instruction until approval to perform the action(s) is received from the user 105.

As discussed herein above, one or more of the components discussed herein (e.g., the plan generation component 135 and/or the LLM shortlister component 160) may be capable of determining whether an ambiguity exists in the user input or the current task, and may determine that additional information is needed. In response to such a determination, in some embodiments the component(s) may be further configured to send a request for such additional information to the response arbitration component 470, which may process as described herein above to generate a request for the additional information to be sent to the personalized context component 210 or to be sent to the action plan execution component 185, which may cause output of the request to the user to solicit the additional information. The request may be presented to the user as synthesized speech, in which case, the request may be sent to the TTS component and then sent to the user device 110. In other cases, the request may be presented to the user as displayed text, in which case the request may be sent to another component to prepare the request for display and then sent to the user device 110.

In some embodiments, the response arbitration component 470 may be/implement an LLM. In such embodiments, the response arbitration component 470 may further include a response generation prompt generation component (not illustrated), which may be configured to generate a prompt instructing the response generation LLM to implement the operations discussed herein above with respect to the response arbitration component 470. As discussed above, with respect to the plan prompt generation component 140, the task selection prompt generation component 150, and the shortlister language model 180, in some embodiments, the response generation prompt generation component may also include in the prompt a sample processing format to be used by the response generation LLM when processing the prompt. Similarly, in some embodiments, the response generation prompt generation component may generate the prompt according to a template format, such as: "You are a conversational AI agent that communicates with users to satisfy their request or ask clarification questions. If no response is needed, indicate that."

As discussed above, the response arbitration component 470 may generate output data 490 for output to the user 105. The system 100 may send the output data 490 to the TTS component (e.g., the TTS component 196), which may process as described herein to generate output audio data including synthesized speech corresponding to the output data 490, which the system 100 may send to the user device 110 for output to the user. In some embodiments, the system may include a component configured to generate visual output data (e.g., output image and/or video data) corresponding to the output data 490, which may be send to the user device 110 to be output to the user.

In some embodiments, the output data 490 may further request authorization from the user 105 to perform the one or more actions responsive to the user input. After receiving the request authorization (e.g., via a subsequent user input) the response arbitration component 470 may generate and send the corresponding instructions to perform the one or more actions responsive to the user input. In some embodiments, the system 100 may store data indicating prior authorization to perform the one or more actions responsive to the user input (or one or more actions similar to the one or more actions determined by the system 100 with respect to the user input data 127), in which case the response arbitration may use such data as authorization to perform the one or more actions, instead of including the further request for authorization in the output data 490. For example, the user 105 may have previously provided authorization for a set of actions. Thereafter, the system 100 may determine the one or more actions to be performed in response to the user input data 127. If the system 100 determines that the one or more actions are included in the set of actions previously authorized by the user 105, the system 100 may not ask for further authorization prior to performing the one or more actions.

In some embodiments, the language models 145, 155, 180, 470 may be fine-tuned to perform a particular task(s). Fine-tuning of the language models 145, 155, 180, 470 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of the plan generation language model 145, the task selection language model 155, and/or the shortlister language model 180 indicates that additional information is needed to complete a first task associated with a user input, a request for the additional information may be sent to the personalized context component 210. Thereafter, the plan generation language model 145, the task selection language model 155, and/or the shortlister language model 180 may continue to process to complete their configured operations. For example, while the personalized context component 210 is processing to determine the additional information, the system 100 may begin processing with respect to a second task associated with the user input. Thereafter, the output of the personalized context component 210 may be sent to the response arbitration component 470 such that once the response arbitration component 470 receives the output of the LLM shortlister component 160, the response arbitration component 470 may resolve the ambiguity that resulted in the request for additional information in order to generate the output data 490. For further example, if the user input data 127 is generated to include the natural language representation of the user input, but the processing required to determine the corresponding contextual signals (e.g., weather data, time of data, dialog history, device information, etc.) is yet to be completed, the plan generation component 135 may begin processing with respect to the natural language representation of the user input. Once the corresponding contextual signals have been generated, the plan generation component 135 may begin processing with respect to the contextual signals and may update downstream components with the result of the processing with respect to the contextual signals.

As another example, if the API shortlister component 170 determines (e.g., with a confidence value that meets or exceeds a particular threshold) that a particular API or API description should be included in the relevant API data, the API shortlister component 170 may provide the corresponding relevant API data to the shortlister prompt generation component 175 so that the shortlister prompt generation component 175 may begin processing with respect to the relevant API data while the API shortlister component 170 continues to determine one or more further relevant API data. In general, the system 100 is capable of performing such streaming and processing of portions of data discussed herein (e.g., for processing with respect to a user input) and updating downstream components with the results of processing of newly available portions of data as the data becomes available for processing.

In some embodiments, one or more of the components discussed herein above may be updated/trained based on various feedback associated with the processing of the one or more components with respect to a user input. For example, the system 100 may include a component that collects and stores various information determined during processing with respect to a user input (e.g., a determined task, a selected task, a prioritization of tasks, a selected API, a generated response, interaction history, dialog history, etc.). The component may further collect information associated with a user satisfaction with the processing of the system 100. The component may determine such user satisfaction information based on implicit and explicit feedback signals. For example, an explicit feedback signal may be a follow-up user input associated with the response generated by the system 100 (e.g., "Add milk, please."), the response arbitration component 470 receiving varying responses from processing performed by the orchestrator component 530 and the LLM orchestrator component 130 (e.g., a first response from the orchestrator component 530 of "add milk to your grocery list" and a second response from the LLM orchestrator component 130 of "can you specify the list?"), a request for additional information output to the user and the user's corresponding response, a system-determined quality of a generated request for clarifying information, etc.

For further example, an implicit feedback signal may be a follow-up user input associated with the response generated by the system 100 (e.g., "Add milk, please."), the response arbitration component 470 receiving varying responses from processing performed by the orchestrator component 530 and the LLM orchestrator component 130 (e.g., a first response from the orchestrator component 530 of "add milk to your grocery list" and a second response from the LLM orchestrator component 130 of "add milk to your shopping list"), a follow-up user input resulting from a user interrupting output of a system-generated response (e.g., prior to completing output of a system-generated response of "adding milk to your shopping list", the user provides the interrupting user input of "no, add it to my grocery list"), a system-determined quality of a system-generated response attempting to preempt a follow-up user input (e.g., a preemptive system-generated response of "add milk to your shopping list" may receive a lower quality score than a preemptive system-generated response of "do you want to add milk to your shopping list?"), etc.

The various data (e.g., the feedback signals) collected by the component may be used by the system 100 to update/train one or more components of the system 100. For example, if a user previously provided a follow-up user input of "Add milk, please," in response to a system-generated response to a user input of "Add eggs to my list", the system 100 may use the explicit feedback signal to update one or more components of the system 100 such that processing of a similar future input of "Add eggs to my list" may result in generation of a response of "Would you also like me to add milk to your list?"

Figure 5:
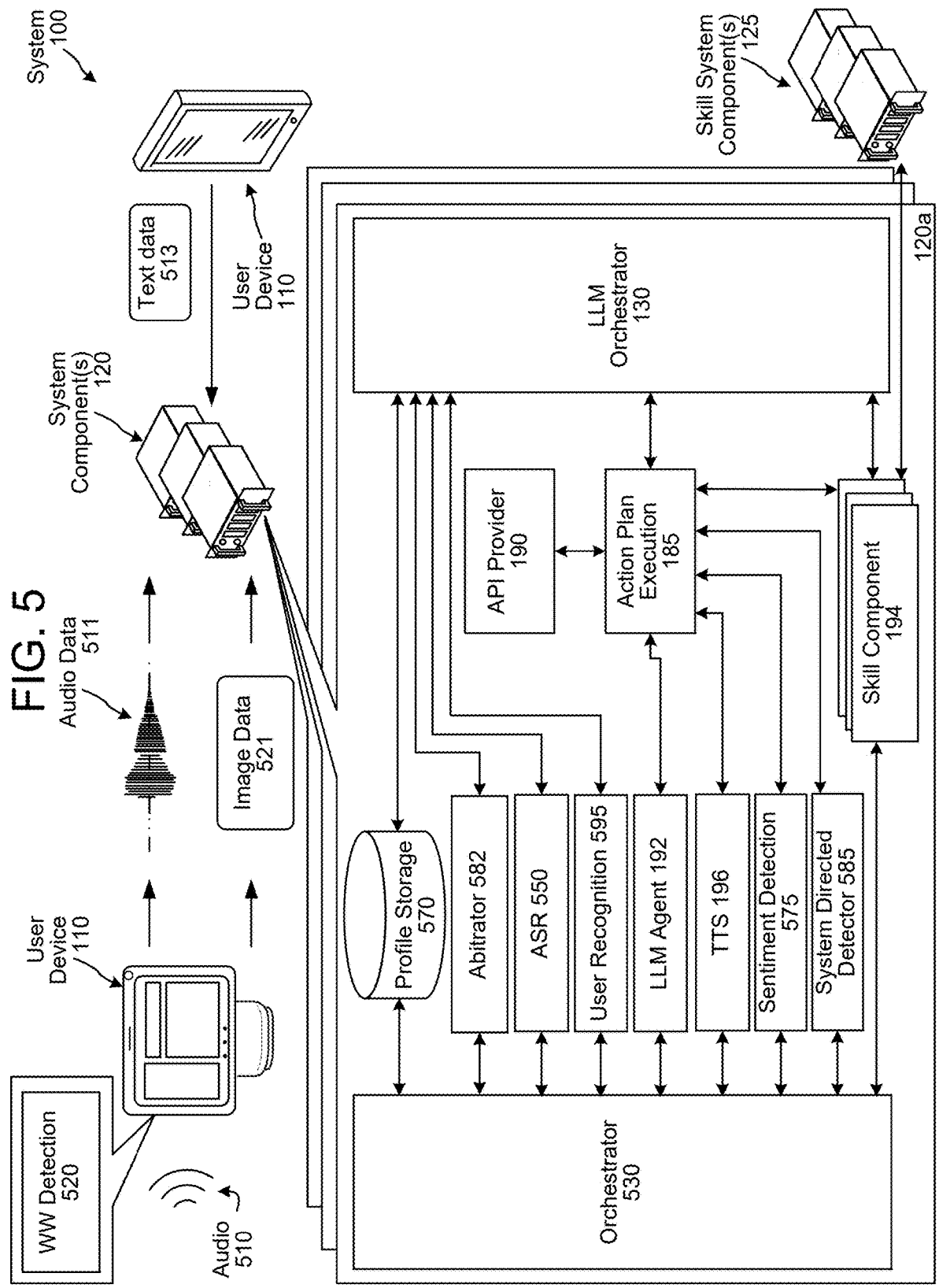
FIG. 5 is a conceptual diagram of components of the system, according to embodiments of the present disclosure.

The system 100 may operate using various components as described in FIG. 5. The various components may be located on same or different physical devices. Communication between various components may occur directly or across a network(s) 199. The user device 110 may include audio capture component(s), such as a microphone or array of microphones of a user device 110, captures audio 510 and creates corresponding audio data. Once speech is detected in audio data representing the audio 510, the user device 110 may determine if the speech is directed at the user device 110/system component(s). In at least some embodiments, such determination may be made using a wakeword detection component 520. The wakeword detection component 520 may be configured to detect various wakewords. In at least some examples, each wakeword may correspond to a name of a different digital assistant. An example wakeword/digital assistant name is "Alexa." In another example, input to the system may be in form of text data 513, for example as a result of a user typing an input into a user interface of user device 110. Other input forms may include indication that the user has pressed a physical or virtual button on user device 110, the user has made a gesture, etc. The user device 110 may also capture images using camera(s) 818 of the user device 110 and may send image data 521 representing those image(s) to the system component(s). The image data 521 may include raw image data or image data processed by the user device 110 before sending to the system component(s). The image data 521 may be used in various manners by different components of the system to perform operations such as determining whether a user is directing an utterance to the system, interpreting a user command, responding to a user command, etc.

The wakeword detection component 520 of the user device 110 may process the audio data, representing the audio 510, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 510, is analyzed to determine if specific characteristics of the audio data match preconfigured acoustic waveforms, audio signatures, or other data corresponding to a wakeword.

Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confu-sion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 520 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 520 and/or input is detected by an input detector, the user device 110 may "wake" and begin transmitting audio data 511, representing the audio 510, to the system component(s) 120. The audio data 511 may include data corresponding to the wakeword; in other embodiments, the portion of the audio corresponding to the wakeword is removed by the user device 110 prior to sending the audio data 511 to the system component(s) 120. In the case of touch input detection or gesture based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 520 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 194 of one or more system component(s) 120.

The user device 110 may also include a system directed input detector 785. (The system component(s) may also include a system directed input detector 585 which may operate in a manner similar to system directed input detector 785.) The system directed input detector 785 may be configured to determine whether an input to the system (for example speech, a gesture, etc.) is directed to the system or not directed to the system (for example directed to another user, etc.). The system directed input detector 785 may work in conjunction with the wakeword detection component 520. If the system directed input detector 785 determines an input is directed to the system, the user device 110 may "wake" and begin sending captured data for further processing (for example, processing audio data using the language processing 592/792, processing captured image data using image processing component 540/740 or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 785 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 785 is determining whether an input is potentially device directed. For example, the system may output an orange indicator while considering an input, and may output a green indicator if a system directed input is detected. Other such configurations are possible.

Upon receipt by the system component(s) 120, the audio data 511 may be sent to an orchestrator component 530 and/or the LLM orchestrator component 130. The orchestrator component 530 may include memory and logic that enables the orchestrator component 530 to transmit various pieces and forms of data to various components of the system, as well as perform other operations as described herein. In some embodiments, the orchestrator component 530 may optionally be included in the system component(s) 120. In embodiments where the orchestrator component 530 is not included in the system component(s) 120, the audio data 511 may be sent directly to the LLM orchestrator component 130. Further, in such embodiments, each of the components of the system component(s) 120 may be configured to interact with the LLM orchestrator component 130, the action plan execution component 185, and/or the API provider component 190.

In some embodiments, the system component(s) 120 may include an arbitrator component 582, which may be configured to determine whether the orchestrator component 530 and/or the LLM orchestrator component 130 are to process with respect to the audio data 511. In some embodiments, the arbitrator component 582 may determine the orchestrator component 530 and/or the LLM orchestrator component 130 are to process with respect to the audio data 511 based on metadata associated with the audio data 511. For example, the arbitrator component 582 may be a classifier configured to process a natural language representation of the audio data 511 (e.g., output by the ASR component 550) and classify the corresponding user input as requiring the processing of the orchestrator component 530 and/or the LLM orchestrator component 130. For further example, the arbitrator component 582 may determine whether the device from which the audio data 511 is received is associated with an indicator representing the audio data 511 is to be processed by the orchestrator component 530 and/or the LLM orchestrator component 130. As an even further example, the arbitrator component 582 may determine whether the user (e.g., determined using data output from the user recognition component 595) from which the audio data 511 is received is associated with a user profile including an indicator representing the audio data 511 is to be processed by the orchestrator component 530 and/or the LLM orchestrator component 130. As another example, the arbitrator component 582 may determine whether the audio data 511 (or the output of the ASR component 550) corresponds to a request representing that the audio data 511 is to be processed by the orchestrator component 530 and/or the LLM orchestrator component 130 (e.g., a request including "let's chat" may represent that the audio data 511 is to be processed by the LLM orchestrator component 130). In some embodiments, if the arbitrator component 582 is unsure (e.g., a confidence score corresponding to whether the orchestrator component 530 and/or the LLM orchestrator component 130 is to process is below a threshold), then the arbitrator component 582 may send the audio data 511 to both of the orchestrator component 530 and the LLM orchestrator component 130. In such embodiments, the orchestrator component 530 and/or the LLM orchestrator component 130 may include further logic for determining further confidence scores during processing representing whether the orchestrator component 530 and/or the LLM orchestrator component 130 should continue processing.

The arbitrator component 582 may send the audio data 511 to an ASR component 550. In some embodiments, the component selected to process the audio data 511 (e.g., the orchestrator component 530 and/or the LLM orchestrator component 130) may send the audio data 511 to the ASR component 550. The ASR component 550 may transcribe the audio data 511 into text data. The text data output by the ASR component 550 represents one or more than one (e.g., in the form of an N-best list) ASR hypotheses representing speech represented in the audio data 511. The ASR component 550 interprets the speech in the audio data 511 based on a similarity between the audio data 511 and pre-established language models. For example, the ASR component 550 may compare the audio data 511 with models for sounds (e.g., acoustic units such as phonemes, senons, phones, etc.) and sequences of sounds to identify words that match the sequence of sounds of the speech represented in the audio data 511. The ASR component 550 sends the text data generated thereby to the arbitrator component 582, the orchestrator component 530, and/or the LLM orchestrator component 130. In instances where the text data is sent to the arbitrator component 582, the arbitrator component 582 may send the text data to the component selected to process the audio data 511 (e.g., the orchestrator component 530 and/or the LLM orchestrator component 130). The text data sent from the ASR component 550 to the arbitrator component 582, the orchestrator component 530, and/or the LLM orchestrator component 130 may include a single top-scoring ASR hypothesis or may include an N-best list including multiple top-scoring ASR hypotheses. An N-best list may additionally include a respective score associated with each ASR hypothesis represented therein.

Figure 6:
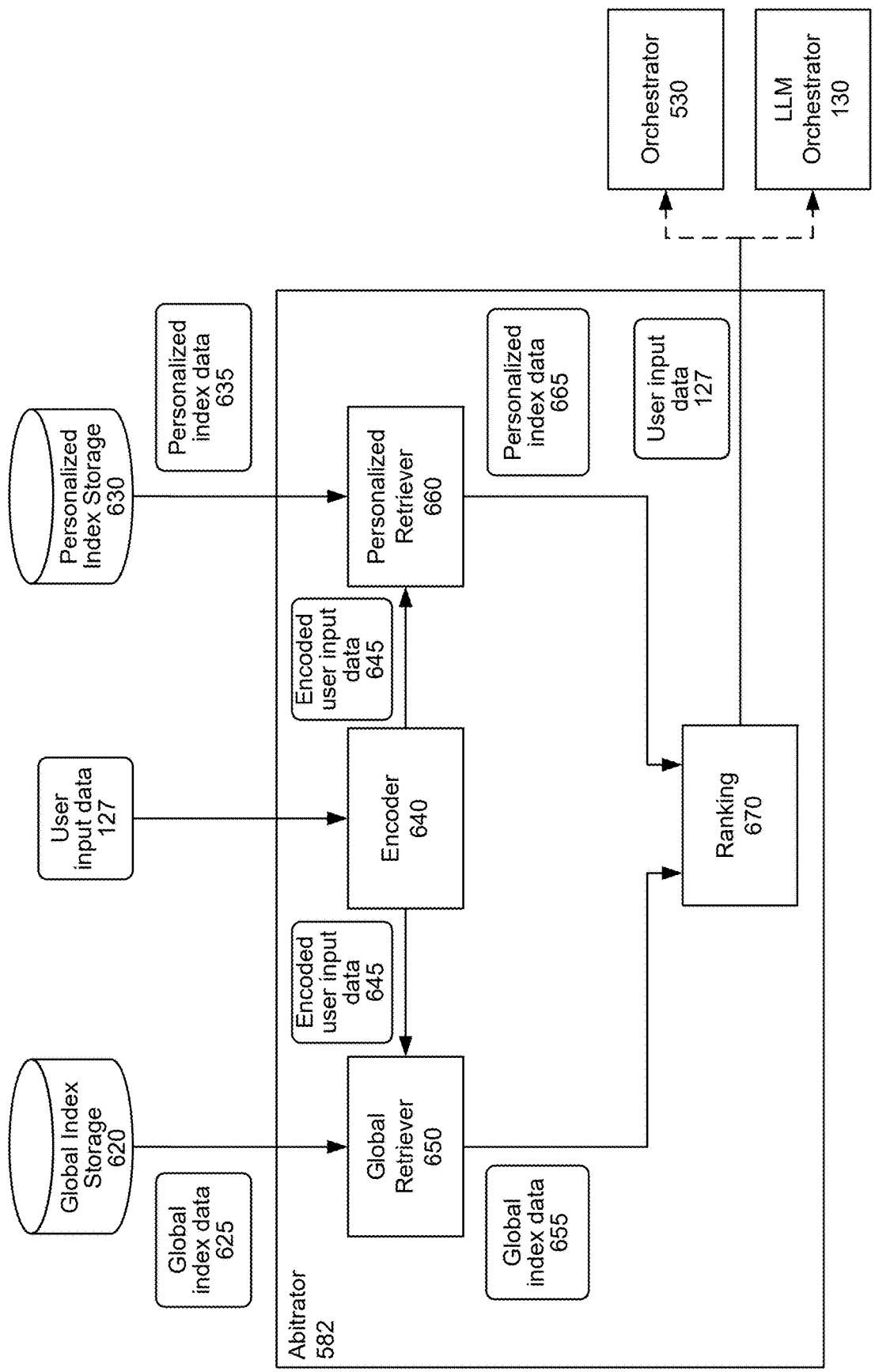
FIG. 6 is a conceptual diagram illustrating example processing of an arbitrator component, according to embodiments of the present disclosure.

FIG. 6 illustrates example components and processing of the arbitrator component 582. As shown in FIG. 6, the arbitrator component 582 may include an encoder component 640, a global retriever component 650, a personalized retriever component 660, and a ranking component 670. The arbitrator component 582 may be in communication with a global index storage 620 and a personalized index storage 630. The arbitrator component 582 may be configured to perform retrieval-based techniques based on a semantic vectorized representation of a user input and historical user inputs received by the system 100 over a period of time (e.g., past 30 days) to determine whether the orchestrator component 530 or the LLM orchestrator component 130 or both of them should process with respect to the user input.

The user input data 127 may be received at the encoder component 640 of the arbitrator component 582. The encoder component 640 may process the user input data 127 to generate encoded user input data 645 represented an encoded representation of the user input data 127 (e.g., a vectorized representation of the user input). The encoder component may send the encoded user input data 645 to the global retriever component 650 and the personalized retriever component 660. In some embodiments, the encoder component 640 may be trained using techniques associated with Deep Structured Semantic Models (DSSM).

The global retriever component 650 is configured to determine one or more historical user inputs that are similar to the user input data 127. The global retriever component 650 queries a global index storage 620 for global index data 625 representing one or more historical user inputs that are semantically similar to the user input data 127. The global retriever component 650 may include one or more historical user inputs received from various users over a period of time (e.g., 30 days). In some embodiments, the global index data 625 may correspond to an encoded representation(s) of the historical user input(s). In such embodiments, the one or more historical user inputs that are semantically similar to the user input data 127 may be determined based on comparing the encoded user input data 645 to the encoder representation(s) of the historical user input(s) (e.g., to determine a cosine similarity). The global retriever component 650 may send the global index data 625 to the ranking component 670.

The personalized retriever component 660 is configured to determine one or more historical user inputs that are similar to the user input data 127, where the one or more historical user inputs are associated with the user 105 that provided the user input corresponding to the user input data 127. The personalized retriever component 660 queries a personalized index storage 630 for personalized index data 635 representing one or more historical user inputs that are semantically similar to the user input data 127 and were provided by the same user that provided the user input corresponding to the user input data 127. The personalized retriever component 660 may include one or more historical user inputs received from the user corresponding to the user input data 127 over a period of time (e.g., 30 days). In some embodiments, the personalized index data 635 may correspond to an encoded representation(s) of the historical user input(s). In such embodiments, the one or more historical user inputs that are semantically similar to the user input data 127 may be determined based on comparing the encoded user input data 645 to the encoder representation(s) of the historical user input(s) (e.g., to determine a cosine similarity). The personalized retriever component 660 may send the personalized index data 635 to the ranking component 670.

In some embodiments, the global index storage 620 and/or the personalized index storage 630 may further include metadata associated with the historical user inputs, which may be further included in the global index data 625 and/or the personalized index data 635. For example, the global index storage 620 and/or the personalized index storage 630 may further include a user satisfaction associated with a system-generated response to the user input, a value representing how many times the user input was received during the time period, a domain (e.g., routine, smart home, shopping, weather, etc.), etc.

In some embodiments, the global retriever component 650 and/or the personalized retriever component 660 may retrieve the global index data 625 and/or the personalized index data 635 semantically similar to the encoded user input data 645 using Maximum Inner Product Search Solution.

The ranking component 670 may process the global index data 655 and the personalized index data 665 to determine whether to send the user input data 127 to the orchestrator component 530 and/or the LLM orchestrator component 130. In some embodiments, the ranking component 670 may make such a determination based on the metadata included in the global index data 655 and/or the personalized index data 665. In some embodiments, the ranking component 670 may be a rule-based component. In other embodiments, the ranking component 670 may be an ML-based component (e.g., a decision tree, a classifier, an LLM, etc.). In embodiments where the ranking component 670 is an LLM, the ranking component 670 may be further configured to determine if there the user input is ambiguous, in which case the ranking component 670 may generate a request for additional information to resolve the ambiguity.

In some embodiments, after determining that the orchestrator component 530 and/or the LLM orchestrator component 130 should process with respect to the user input data 127, the ranking component 670 may be configured to periodically determine whether the orchestrator component 530 and/or the LLM orchestrator component 130 should continue processing with respect to the user input data 127. For example, after a particular point in the processing of the orchestrator component 530 (e.g., after performing NLU, prior to determining a skill component 194 to process with respect to the user input data 127, prior to performing an action responsive to the user input, etc.) and/or the LLM orchestrator component 130 (e.g., after selecting a task to be completed, after receiving the action response data from the one or more components, after completing a task, prior to performing an action responsive to the user input, etc.) the orchestrator component 530 and/or the LLM orchestrator component 130 may query the arbitrator component 582 has determined that the orchestrator component 530 and/or the LLM orchestrator component 130 should halt processing with respect to the user input data 127. As discussed above, the system 100 may be configured to stream portions of data associated with processing with respect to a user input to the one or more components such that the one or more components may begin performing their configured processing with respect to that data as soon as it is available to the one or more components. As such, the arbitrator component 582 may cause the orchestrator component 530 and/or the LLM orchestrator component 130 to begin processing with respect to a user input as soon as a portion of data associated with the user input data 127 is available (e.g., the ASR data, context data, output of the user recognition component 595. Thereafter, once the arbitrator component 582 has enough data to perform the processing described herein above to determine whether the orchestrator component 530 and/or the LLM orchestrator component 130 is to process with respect to the user input, the arbitrator component 582 may inform the corresponding component (e.g., the orchestrator component 530 and/or the LLM orchestrator component 130) to continue/halt processing with respect to the user input at one of the logical checkpoints in the processing of the orchestrator component 530 and/or the LLM orchestrator component 130.

As discussed herein above, in some embodiments, the LLM shortlister component 160 (e.g., via the API shortlister component 170 and/or the shortlister language model 180) may be configured to select the orchestrator component 530 to process with respect to the user input and/or a current task to return action response data (e.g., the action response data 197a) representing a response to the user input/current task or a description of an action the orchestrator component 530 may cause to be performed in response to the user input/current task. As such, in some embodiments, although the LLM orchestrator component 130 is determined to process with respect to a user input, the LLM orchestrator component 130 may determine, during such processing, that the orchestrator component 530 should process with respect to the user input.

A skill system component(s) 125 may communicate with a skill component(s) 194 within the system component(s) 120 directly with the orchestrator component 530 and/or the action plan execution component 185, or with other components. A skill system component(s) 125 may be configured to perform one or more actions. An ability to perform such action(s) may sometimes be referred to as a "skill." That is, a skill may enable a skill system component(s) 125 to execute specific functionality in order to provide data or perform some other action requested by a user. For example, a weather service skill may enable a skill system component(s) 125 to provide weather information to the system component(s) 120, a car service skill may enable a skill system component(s) 125 to book a trip with respect to a taxi or ride sharing service, an order pizza skill may enable a skill system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 194 dedicated to interacting with the skill system component(s) 125. Unless expressly stated otherwise, reference to a skill, skill device, or skill component may include a skill component 194 operated by the system component(s) 120 and/or skill operated by the skill system component(s) 125. Moreover, the functionality described herein as a skill or skill may be referred to using many different terms, such as an action, bot, app, or the like. The skill component 194 and or skill system component(s) 125 may return output data to the orchestrator component 530.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 196. The TTS component 196 may generate audio data (e.g., synthesized speech) from text data using one or more different methods. Text data input to the TTS component 196 may come from a skill component 194, the orchestrator component 530, or another component of the system. In one method of synthesis called unit selection, the TTS component 196 matches text data against a database of recorded speech. The TTS component 196 selects matching units of recorded speech and concatenates the units together to form audio data. In another method of synthesis called parametric synthesis, the TTS component 196 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 5 to request capture of image or video data. The user device 110 may process the commands locally or send audio data 511 representing the commands to the system component(s) 120 for processing, after which the system component(s) 120 may return output data that can cause the user device 110 to engage its camera.

The system component(s) 120 may include a user recognition component 595 that recognizes one or more users using a variety of data. However, the disclosure is not limited thereto, and the user device 110 may include a user recognition component 795 instead of and/or in addition to user recognition component 595 of the system component(s) 120 without departing from the disclosure. User recognition component 795 operates similarly to user recognition component 595.

The user recognition component 595 may take as input the audio data 511 and/or text data output by the ASR component 550. The user recognition component 595 may perform user recognition by comparing audio characteristics in the audio data 511 to stored audio characteristics of users. The user recognition component 595 may also perform user recognition by comparing biometric data (e.g., fingerprint data, iris data, etc.), received by the system in correlation with the present user input, to stored biometric data of users assuming user permission and previous authorization. The user recognition component 595 may further perform user recognition by comparing image data (e.g., including a representation of at least a feature of a user), received by the system in correlation with the present user input, with stored image data including representations of features of different users. The user recognition component 595 may perform additional user recognition processes, including those known in the art.

The user recognition component 595 determines scores indicating whether user input originated from a particular user. For example, a first score may indicate a likelihood that the user input originated from a first user, a second score may indicate a likelihood that the user input originated from a second user, etc. The user recognition component 595 also determines an overall confidence regarding the accuracy of user recognition operations.

Output of the user recognition component 595 may include a single user identifier corresponding to the most likely user that originated the user input. Alternatively, output of the user recognition component 595 may include an N-best list of user identifiers with respective scores indicating likelihoods of respective users originating the user input. The output of the user recognition component 595 may be used to inform processing of the arbitrator component 582, the orchestrator component 530, and/or the LLM orchestrator component 130 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 575 that may be configured to detect a sentiment of a user from audio data representing speech/utterances from the user, image data representing an image of the user, and/or the like. The sentiment detection component 575 may be included in system component(s) 120, as illustrated in FIG. 5, although the disclosure is not limited thereto and the sentiment detection component 575 may be included in other components without departing from the disclosure. For example the sentiment detection component 775 may be included in the user device 110, as a separate component, etc. Sentiment detection component 775 may operate similarly to sentiment detection component 575. The system component(s) may use the sentiment detection component 575 to, for example, customize a response for a user based on an indication that the user is happy or frustrated.

Figure 7:
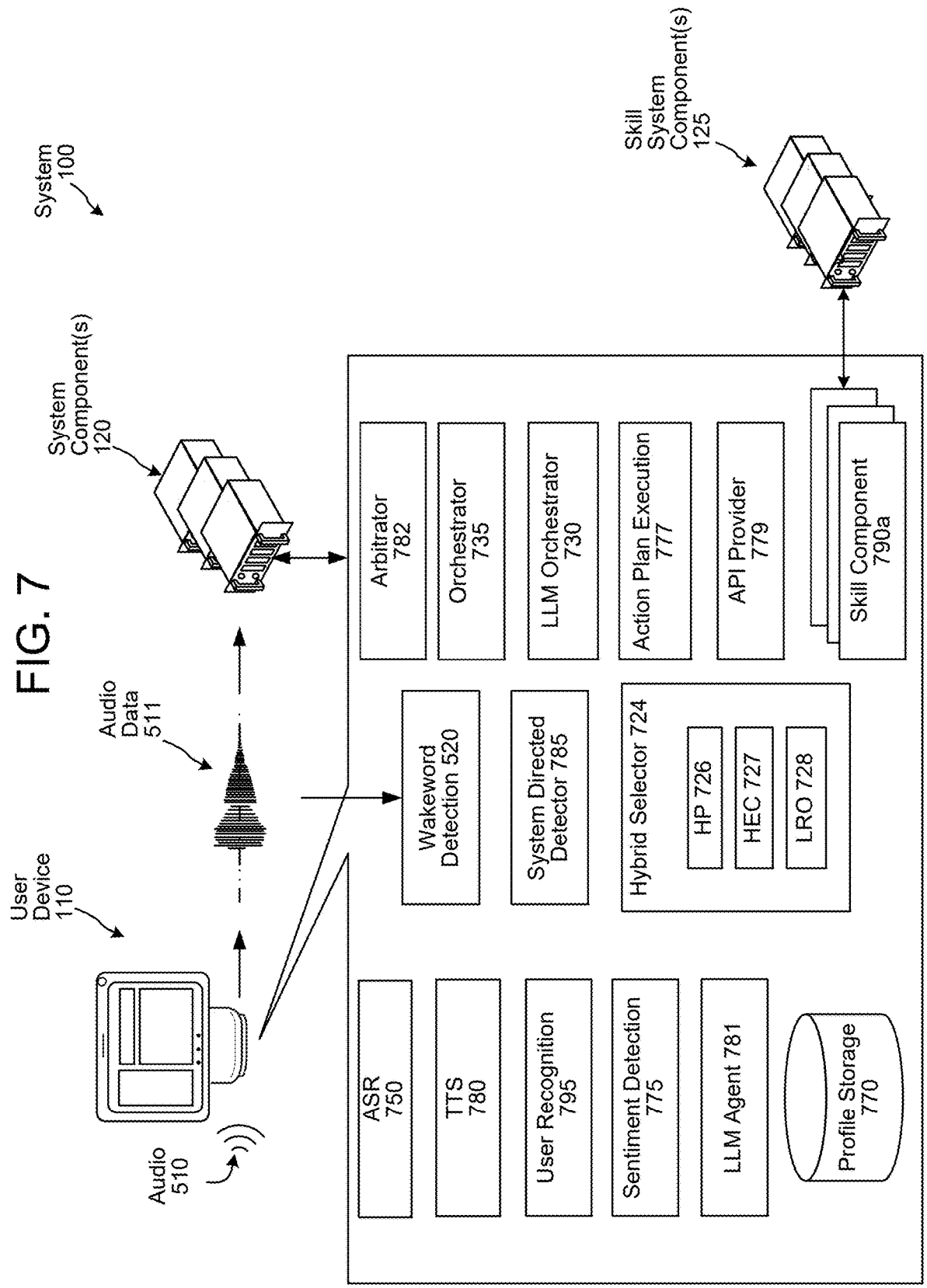
FIG. 7 is a conceptual diagram illustrating components that may be included in a device, according to embodiments of the present disclosure.

Although the components of FIG. 5 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 7 illustrates such a configured user device 110.

In at least some embodiments, the system component(s) may receive the audio data 511 from the user device 110, to recognize speech corresponding to a spoken input in the received audio data 511, and to perform functions in response to the recognized speech. In at least some embodiments, these functions involve sending directives (e.g., commands), from the system component(s) to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may instruct the user device 110 to output an audible response (e.g., using TTS processing performed by an on-device TTS component 780) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 5, the user device 110 may include a wakeword detection component 520 configured to compare the audio data 511 to stored models used to detect a wakeword (e.g., "Alexa") that indicates to the user device 110 that the audio data 511 is to be processed by the user device 110 (e.g., by the orchestrator component 735 and/or the LLM orchestrator 730, which are configured similar to the orchestrator component 530 and the LLM orchestrator component 130, respectively). In at least some embodiments, a hybrid selector 724, of the user device 110, may send the audio data 511 to the wakeword detection component 520. If the wakeword detection component 520 detects a wakeword in the audio data 511, the wakeword detection component 520 may send an indication of such detection to the hybrid selector 724. In response to receiving the indication, the hybrid selector 724 may send the audio data 511 to the system component(s) and/or the ASR component 750. The wakeword detection component 520 may also send an indication, to the hybrid selector 724, representing a wakeword was not detected. In response to receiving such an indication, the hybrid selector 724 may refrain from sending the audio data 511 to the system component(s), and may prevent the ASR component 750 from further processing the audio data 511. In this situation, the audio data 511 can be discarded.

The user device 110 may conduct its own speech processing using on-device language processing components, such as an ASR component 750, similar to the manner discussed herein with respect to the ASR component 550 of the system component(s). The ASR component 750 may operate similarly to ASR component 550. The user device 110 may also internally include, or otherwise have access to, other components such as one or more skill components 790 capable of executing commands based on the output of the orchestrator component 735, the LLM orchestrator 730, or other results determined by the user device 110/system component(s) (which may operate similarly to skill components 194), an arbitrator component 782 (configured to process in a similar manner to that discussed herein above with respect to the arbitrator component 582), an action plan execution component 777 (configured to process in a similar manner to that discussed herein with respect to the action plan execution component 185), an API provider component 779 (configured to process in a similar manner to that discussed herein with respect to the API provider component 190), and LLM agent component 781 (configured to process in a similar manner to that discussed herein with respect to the LLM agent component 192), a user recognition component 795 (configured to process in a similar manner to that discussed herein with respect to the user recognition component 595 of the system component(s)), profile storage 770 (configured to store similar profile data to that discussed herein with respect to the profile storage 570 of the system component(s)), or other components. In at least some embodiments, the profile storage 770 may only store profile data for a user or group of users specifically associated with the user device 110. Similar to as described above with respect to skill component 194, a skill component 790 may communicate with a skill system component(s) 125. The user device 110 may also have its own TTS component 780, which may operate similarly to TTS component 196.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s).

The hybrid selector 724, of the user device 110, may include a hybrid proxy (HP) 726 configured to proxy traffic to/from the system component(s). For example, the HP 726 may be configured to send messages to/from a hybrid execution controller (HEC) 727 of the hybrid selector 724. For example, command/directive data received from the system component(s) can be sent to the HEC 727 using the HP 726. The HP 726 may also be configured to allow the audio data 511 to pass to the system component(s) while also receiving (e.g., intercepting) this audio data 511 and sending the audio data 511 to the HEC 727.

In at least some embodiments, the hybrid selector 724 may further include a local request orchestrator (LRO) 728 configured to notify the ASR component 750 about the availability of new audio data 511 that represents user speech, and to otherwise initiate the operations of local language processing when new audio data 511 becomes available. In general, the hybrid selector 724 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) and chooses to use that remotely-determined directive data.

Thus, when the audio data 511 is received, the HP 726 may allow the audio data 511 to pass through to the system component(s) and the HP 726 may also input the audio data 511 to the on-device ASR component 750 by routing the audio data 511 through the HEC 727 of the hybrid selector 724, whereby the LRO 728 notifies the ASR component 750 of the audio data 511. At this point, the hybrid selector 724 may wait for response data from either or both of the system component(s) or the local language processing components. However, the disclosure is not limited thereto, and in some examples the hybrid selector 724 may send the audio data 511 only to the local ASR component 750 without departing from the disclosure. For example, the user device 110 may process the audio data 511 locally without sending the audio data 511 to the system component(s).

The local ASR component 750 is configured to receive the audio data 511 from the hybrid selector 724, and to recognize speech in the audio data 511. The user device 110 and/or the system component(s) may associate a unique identifier with each natural language user input. The user device 110 may include the unique identifier when sending the audio data 511 to the system component(s), and the response data from the system component(s) may include the unique identifier to identify which natural language user input the response data corresponds.

In at least some embodiments, the user device 110 may include, or be configured to use, one or more skill components 790 that may work similarly to the skill component(s) 194 implemented by the system component(s). The skill component(s) 790 may correspond to one or more domains that are used in order to determine how to act on a spoken input in a particular way, such as by outputting a directive that corresponds to the determined intent, and which can be processed to implement the desired operation. The skill component(s) 790 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

As used herein, a "skill" may refer to a skill component 790, a skill system component(s) 125, or a combination of a skill component 790 and a corresponding skill system component(s) 125.

Similar to the manner discussed with regard to FIG. 5, the local user device 110 may be configured to recognize multiple different wakewords and/or perform different categories of tasks depending on the wakeword. Such different wakewords may invoke different processing components of local user device 110 (not illustrated in FIG. 7). For example, detection of the wakeword "Alexa" by the wakeword detection component 520 may result in sending audio data to certain skill components 790 for processing while detection of the wakeword "Computer" by the wakeword detector may result in sending audio data different skill components 790 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 8:
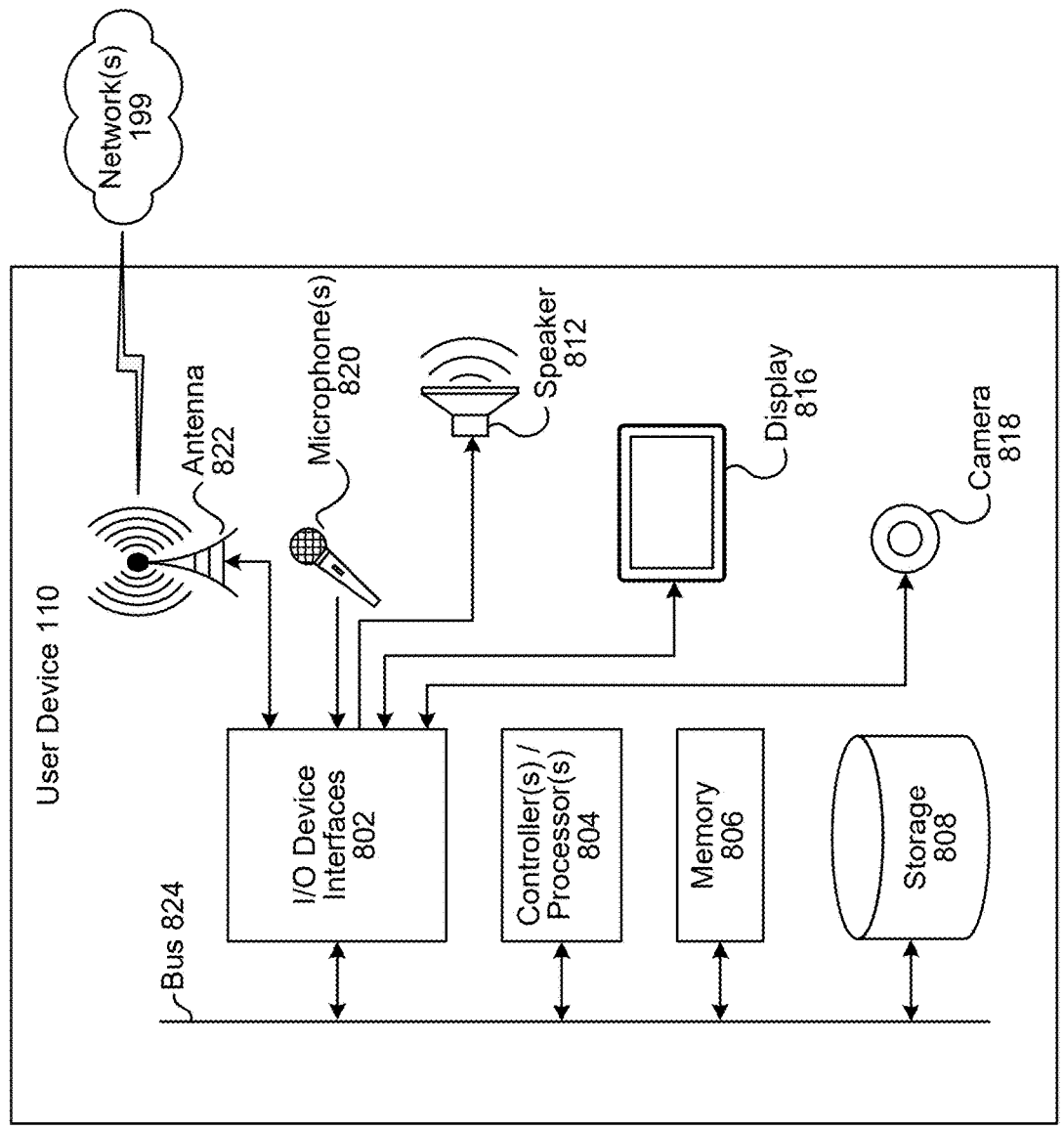
FIG. 8 is a block diagram conceptually illustrating example components of a device, according to embodiments of the present disclosure.
Figure 9:
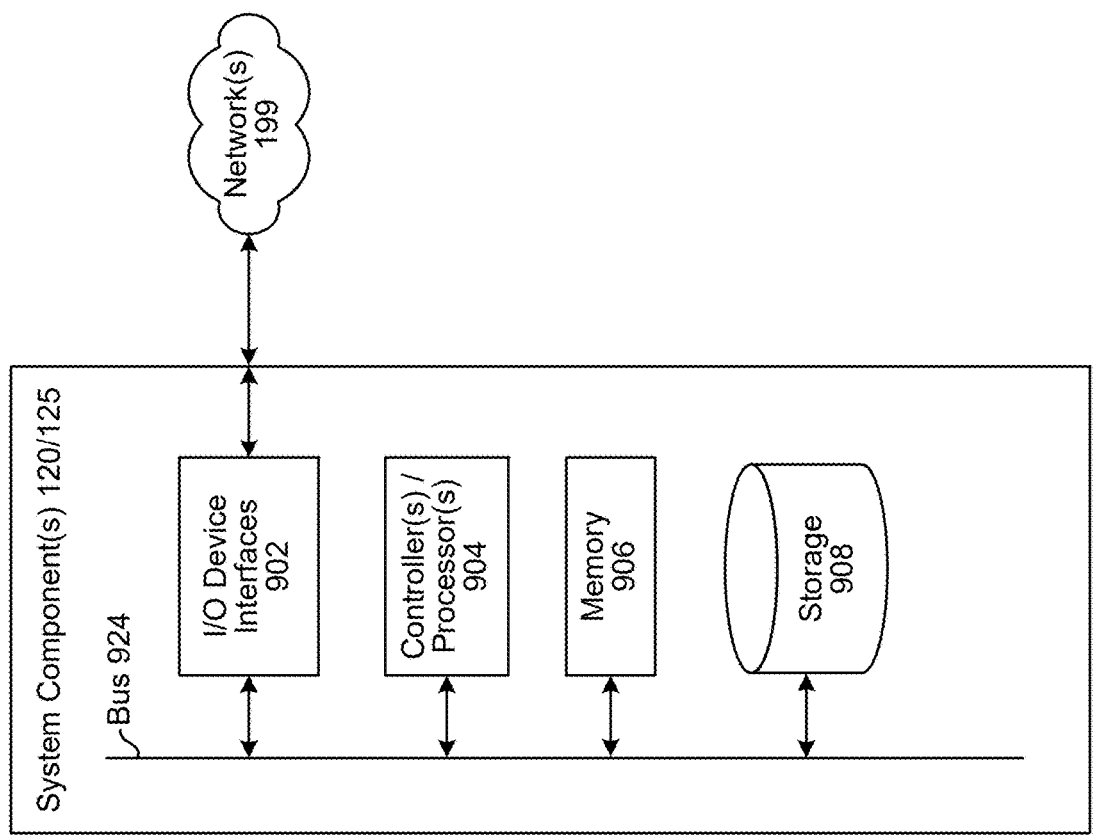
FIG. 9 is a block diagram conceptually illustrating example components of a system, according to embodiments of the present disclosure.

FIG. 8 is a block diagram conceptually illustrating a user device 110 that may be used with the system. FIG. 9 is a block diagram conceptually illustrating example components of a remote device, such as the natural language command processing system component(s), which may assist with ASR processing, and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 110 may operate locally to a user (e.g., within a same environment so the device may receive inputs and playback outputs for the user) the server/system component(s) may be located remotely from the user device 110 as its operations may not require proximity to the user. The server/system component(s) may be located in an entirely different location from the user device 110 (for example, as part of a cloud computing system or the like) or may be located in a same environment as the user device 110 but physically separated therefrom (for example a home server or similar device that resides in a user's home or business but perhaps in a closet, basement, attic, or the like). The system component(s) 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/125) may be included in the overall system 100 of the present disclosure, such as one or more natural language processing system component(s) 120 for performing ASR processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the user device 110 may include input/output device interfaces 802 that connect to a variety of components such as an audio output component such as a speaker 812, a wired headset or a wireless headset (not illustrated), or other component capable of outputting audio. The user device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 816 for displaying content. The user device 110 may further include a camera 818.

Via antenna(s) 822, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the natural language command processing system component(s), or a skill system component(s) 125 may include their own dedicated processors, memory, and/or storage. Alternatively, one or more of the components of the device(s) 110, the natural language command processing system component(s), or a skill system component(s) 125 may utilize the I/O interfaces (802/902), processor(s) (804/904), memory (806/906), and/or storage (808/908) of the device(s) 110, natural language command processing system component(s), or the skill system component(s) 125, respectively. Thus, the ASR component 550 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the natural language command processing system component(s), and a skill system component(s) 125, as described herein, are illustrative, and may be located as a stand-alone device or may be included, in whole or in part, as a component of a larger device or system. As can be appreciated, a number of components may exist either on a system component(s) and/or on user device 110. For example, language processing 592/792 (which may include ASR 550/750), language output 593/793 (which may include NLG 579/779 and TTS 580/780), etc., for example as illustrated in FIGS. 5 and 7. Unless expressly noted otherwise, the system version of such components may operate similarly to the device version of such components and thus the description of one version (e.g., the system version or the local version) applies to the description of the other version (e.g., the local version or system version) and vice-versa.

Figure 10:
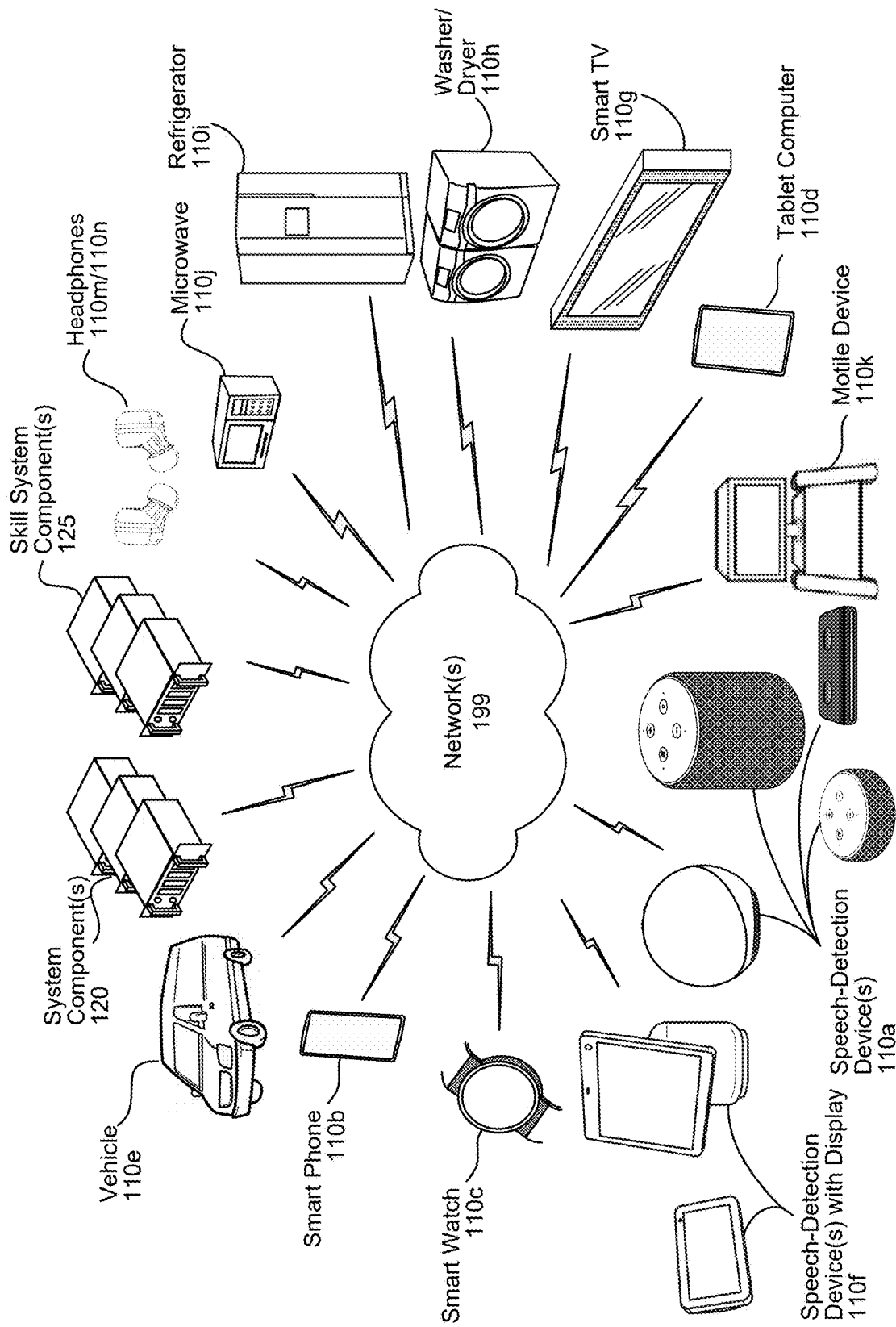
FIG. 10 illustrates an example of a computer network for use with the overall system, according to embodiments of the present disclosure.

As illustrated in FIG. 10, multiple devices (110*a*-110*n*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection user device 110*a*, a smart phone 110*b*, a smart watch 110*c*, a tablet computer 110*d*, a vehicle 110*e*, a speech-detection device with display 110*f*, a display/smart 58 eleviseion 110*g*, a washer/dryer 110*h*, a refrigerator 110*i*, a microwave 110*j*, autonomously motile user device 110*k* (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, or other components of the same device or another device connected via the network(s) 199, such as the ASR component 550, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving first audio data corresponding to a first spoken input;
    performing automatic speech recognition (ASR) processing on the first audio data to generate a first transcript of the first spoken input;
    determining context data associated with the first spoken input, the context data representing a previous spoken input of a user associated with the first spoken input;
    determining a first prompt including the first transcript and the context data, wherein the first prompt is a first instruction to determine at least one task associated with performing an action responsive to the first spoken input;

processing, using a first language model, the first prompt to generate first output data indicating a first task;

retrieving, from a storage, a first set of component descriptions associated with the first task, wherein the first set of component descriptions represent one or more functions performable by at least a first component, a second component, and a third component;

determining a second prompt including the first transcript, the context data, the first task, and the first set of component descriptions, wherein the second prompt is a second instruction for a second language model to generate instructions usable to cause one or more of the first component, the second component, and the third component to process with respect to the first task;

processing, using the second language model, the second prompt to:
    generate a first application programming interface (API) call requesting that the first component process with respect to the first task, and
    generate a second API call requesting that the second component process with respect to the first task;

using the first API call, causing the first component to generate second output data indicating a first function performable by the first component with respect to the first task;

using the second API call, causing the second component to generate third output data indicating a second function performable by the second component with respect to the first task;

determining the first function, instead of the second function, is responsive to the first task; and causing the first component to perform the first function.

2. The computer-implemented method of claim 1, wherein the first output data further indicates a second task and the method further comprises:

determining a third prompt including the first prompt and the first output data, wherein the third prompt is a third instruction to select a task to be performed;

processing, using a third language model, the third prompt to generate fourth output data indicating the first task is to be performed prior to the second task, wherein determining the first set of component descriptions is based on the fourth output data;

retrieving, from the storage, a second set of component descriptions associated with the second task, wherein the second set of component descriptions represent one or more functions performable by at least a fourth component and a fifth component;

determining a fourth prompt including the first transcript, the context data, the second task, and the second set of component descriptions;

processing, using the second language model, the fourth prompt to:
    generate a third API call requesting that the fourth component process with respect to the second task, and
    generate a fourth API call requesting that the fifth component process with respect to the second task;

using the third API call, causing the fourth component to generate fifth output data indicating a third function performable by the fourth component with respect to the second task; and using the fourth API call, causing the fifth component to generate sixth output data indicating a fourth function performable by the fifth component with respect to the second task, wherein causing the first component to perform the first function further includes:
    determining the third function is responsive to the second task,
    determining the first function and the third function correspond to the action responsive to the first spoken input, and
    causing the third component to perform the third function.

3. The computer-implemented method of claim 1, further comprising:

identifying, in the storage, a first component description associated with the first component;

determining a first semantic similarity between the first component description and the first task;

based on the first semantic similarity, including the first component description in the first set of component descriptions;

identifying, in the storage, a second component description associated with the second component;

determining a second semantic similarity between the second component description and the first task; and based on the second semantic similarity, including the second component description in the first set of component descriptions.

4. The computer-implemented method of claim 3, wherein the first set of component descriptions includes the first component description and the second component description, and the method further comprises:

processing, by the second language model, the first component description to generate the first API call, wherein:
    the first API call includes a first input parameter determined by the second language model, and
    the first API call further requests the first component provide a first description of the first function; and processing, by the second language model, the second component description to generate the second API call, wherein:
    the second API call includes a second input parameter determined by the second language model, and
    the second API call requests the second component provide a second description of the second function.

5. A computer-implemented method comprising:

receiving first natural language input data corresponding to a first user input;

determining a first prompt including the first natural language input data, wherein the first prompt is a first instruction to determine one or more tasks associated with performing an action responsive to the first user input;

processing, using a first language model, the first prompt to generate first output data indicating at least a first task to be performed;

determining a first set of component descriptions associated with the first task, wherein the first set of component descriptions represent one or more functions performable by at least a first component and a second component;

determining a second prompt including the first natural language input data, the first task, and the first set of component descriptions, wherein the second prompt is a second instruction for a second language model to generate instructions usable to cause one or more of the first component and the second component to process with respect to the first task;

processing, using the second language model, the second prompt to:
  generate a first application programming interface (API) call requesting that the first component process with respect to the first task, and
  generate a second API call requesting that the second component process with respect to the first task;
based at least in part on the first API call, receiving second output data indicating a first function performable by the first component with respect to the first task;
based at least in part on the second API call, receiving third output data indicating a second function performable by the second component with respect to the first task;
determining the first function is responsive to the first task; and
causing the first component to perform the first function.

6. The computer-implemented method of claim 5, wherein the first output data further indicates a second task and the method further comprises:
  determining a third prompt including the first prompt and the first output data, wherein the third prompt is a third instruction to select a task of the one or more tasks to be performed;
  processing, using a third language model, the third prompt to generate fourth output data indicating the first task is to be performed prior to the second task, wherein determining the first set of component descriptions is based on the fourth output data;
  determining second data representing a second set of component descriptions associated with the second task, wherein the second set of component descriptions represent one or more functions performable by at least a third component and a fourth component;
  determining a fourth prompt including the first natural language input data, the second task, and the second set of component descriptions;
  processing, using the second language model, the fourth prompt to:
    generate a third API call requesting that the third component process with respect to the second task, and
    generate a fourth API call requesting that the fourth component process with respect to the second task;
  based at least in part on the third API call, causing the third component to process the second task to generate fifth output data indicating a third function performable by the third component with respect to the second task; and
  based at least in part on the fourth API call, causing the fourth component to process the second task to generate sixth output data indicating a fourth function performable by the fourth component with respect to the second task, wherein causing the first component to perform the first function further includes:
    determining the third function is responsive to the second task,
    determining the first function and the third function correspond to the action responsive to the first user input, and
    causing the third component to perform the third function.

7. The computer-implemented method of claim 5, further comprising:
  identifying, in a storage, a first component description associated with the first component;
  determining a first semantic similarity between the first component description and the first task;
  based on the first semantic similarity, including the first component description in the first set of component descriptions;
  identifying, in the storage, a second component description associated with the second component;
  determining a second semantic similarity between the second component description and the first task; and
  based on the second semantic similarity, including the second component description in the first set of component descriptions.

8. The computer-implemented method of claim 7, further comprising:
  processing, by the second language model, the first component description to generate the first API call, wherein:
    the first API call includes a first input parameter determined by the second language model,
    the first API call requests the first component provide a first description of the first function, and
    the first API call is used to cause the first component to generate the second output data; and
  processing, by the second language model, the second component description to generate the second API call, wherein:
    the second API call includes a second input parameter determined by the second language model,
    the second API call requests the second component provide a second description of the second function, and
    the second API call is used to cause the second component to generate the third output data.

9. The computer-implemented method of claim 5, further comprising:
  receiving input data representing detection of an event;
  determining a third prompt including the input data, wherein the third prompt is a third instruction to determine one or more tasks associated with performing a second action responsive to the event;
  processing, using the first language model, the third prompt to generate fourth output data indicating at least a second task to be performed;
  determining a second set of component descriptions associated with the second task, wherein the second set of component descriptions represent one or more functions performable by at least a third component and a fourth component;
  determining a fourth prompt including the input data, the second task, and the second set of component descriptions, wherein the fourth prompt is a fourth instruction for the second language model to generate instructions usable to cause one or more of the third component and the fourth component to process with respect to the second task;
  processing, using the second language model, the fourth prompt to:
    generate a third API call requesting that the third component process with respect to the second task, and
    generate a fourth API call requesting that the fourth component process with respect to the second task;
  based at least in part on the third API call, receiving fifth output data indicating a third function performable by the third component with respect to the second task;

based at least in part on the second API call, receiving sixth output data indicating a fourth function performable by the fourth component with respect to the second task;

determining the third function is responsive to the second task; and causing the third component to perform the third function.

10. The computer-implemented method of claim 5, further comprising:

prior to determining the first prompt, determining a third prompt including the first natural language input data, wherein the third prompt is a third instruction to determine the one or more tasks associated with performing the action responsive to the first natural language input data;

processing, using the first language model, the third prompt to generate fourth output data indicating an ambiguity associated with the first natural language input data; and based on the fourth output data, determining natural language data representing a user preference, wherein:
the user preference resolves the ambiguity, and
the first prompt further includes the natural language data.

11. The computer-implemented method of claim 5, wherein causing the first component to perform the first function comprises:

generating fourth output data representing the first function and requesting authorization to perform the first function;

receiving second natural language input data corresponding to the authorization; and based on receiving the second natural language input data, sending, to a third component, a third instruction to cause performance of the first function.

12. The computer-implemented method of claim 5, further comprising:

processing, using an encoder, the first natural language input data to generate an encoded natural language input data;

identifying, in a storage and based on the encoded natural language input data, second data including an encoded representation of a previous user input, a first action responsive to the previous user input, and an indication of a user satisfaction with the first action; and processing, using a third component, the encoded natural language input data and the second data to determine a first score representing a semantic similarity between the encoded natural language input data and the second data, wherein receiving the first natural language input data is based on the first score.

13. A computing system comprising:
at least one processor; and
at least one memory including instructions that, when executed by the at least one processor, cause the computing system to:
receive first natural language input data corresponding to a first user input;
determine a first prompt including the first natural language input data, wherein the first prompt is a first instruction to determine one or more tasks associated with performing an action responsive to the first user input;
process, using a first language model, the first prompt to generate first output data indicating at least a first task to be performed;

determine a first set of component descriptions associated with the first task, wherein the first set of component descriptions represent one or more functions performable by at least a first component and a second component;

determine a second prompt including the first natural language input data, the first task, and the first set of component descriptions, wherein the second prompt is a second instruction for a second language model to generate instructions usable to cause one or more components associated with the first set of component descriptions to process with respect to the first task;

process, using the second language model, the second prompt to:
generate a first application programming interface (API) call requesting that the first component process with respect to the first task, and
generate a second API call that the second component process with respect to the first task;

based at least in part on the first API call, receive second output data indicating a first function performable by the first component with respect to the first task;

based at least in part on the second API call, receive third output data indicating a second function performable by the second component with respect to the first task;

determine the first function is responsive to the first task; and cause the first component to perform the first function.

14. The computing system of claim 13, wherein the first output data further indicates a second task and wherein the at least one memory further comprises instructions that, when executed by the at least one processor, further cause the computing system to:

determine a third prompt including the first prompt and the first output data, wherein the third prompt is a third instruction to select a task of the one or more tasks to be performed;

process, using a third language model, the third prompt to generate fourth output data indicating the first task is to be performed prior to the second task, wherein determining the first set of component descriptions is based on the fourth output data;

determine second data representing a second set of component descriptions associated with the second task, wherein the second set of component descriptions represent one or more functions performable by at least a third component and a fourth component;

determine a fourth prompt including the first natural language input data, the second task, and the second set of component descriptions;

process, using the second language model, the fourth prompt to:
generate a third API call requesting that the third component process with respect to the second task, and
generate a fourth API call requesting that the fourth component process with respect to the second task;

based at least in part on the third API call, cause the third component to process the second task to generate fifth output data indicating a third function performable by the third component with respect to the second task; and based at least in part on the fourth API call, cause the fourth component to process the second task to generate sixth output data indicating a fourth function performable by the fourth component with respect to the second task, wherein causing the first component to perform the first function further includes:
    determining the third function is responsive to the second task,
    determining the first function and the third function correspond to the action responsive to the first user input, and
    causing the third component to perform the third function.

15. The computing system of claim 13, wherein the at least one memory further comprises instructions that, when executed by the at least one processor, further cause the computing system to:
    identify, in a storage, a first component description associated with the first component;
    determine a first semantic similarity between the first component description and the first task;
    based on the first semantic similarity, include the first component description in the first set of component descriptions;
    identify, in the storage, a second component description associated with the second component;
    determine a second semantic similarity between the second component description and the first task; and
    based on the second semantic similarity, include the second component description in the first set of component descriptions.

16. The computing system of claim 15, wherein the at least one memory further comprises instructions that, when executed by the at least one processor, further cause the computing system to:
    process, by the second language model, the first component description to generate the first API call, wherein:
        the first API call includes a first input parameter determined by the second language model,
        the first API call requests the first component provide a first description of the first function, and
        the first API call is used to cause the first component to generate the second output data; and
    process, by the second language model, the second component description to generate the second API call, wherein:
        the second API call includes a second input parameter determined by the second language model,
        the second API call requests the second component provide a second description of the second function, and
        the second API call is used to cause the second component to generate the third output data.

17. The computing system of claim 13, wherein the at least one memory further comprises instructions that, when executed by the at least one processor, further cause the computing system to:
    receive input data representing detection of an event;
    determine a third prompt including the input data, wherein the third prompt is a third instruction to determine one or more tasks associated with performing a second action responsive to the event;
    process, using the first language model, the third prompt to generate fourth output data indicating at least a second task to be performed;
    determine a second set of component descriptions associated with the second task, wherein the second set of component descriptions represent one or more functions performable by at least a third component and a fourth component;
    determine a fourth prompt including the input data, the second task, and the second set of component descriptions, wherein the fourth prompt is a fourth instruction for the second language model to generate instructions usable to cause one or more of the third component and the fourth component to process with respect to the second task;
    process, using the second language model, the fourth prompt to:
        generate a third API call requesting that the third component process with respect to the second task, and
        generate a fourth API call requesting that the fourth component process with respect to the second task;
    based at least in part on the third API call, receive fifth output data indicating a third function performable by the third component with respect to the second task;
    based at least in part on the second API call, receive sixth output data indicating a fourth function performable by the fourth component with respect to the second task;
    determine the third function is responsive to the second task; and
    cause the third component to perform the third function.

18. The computing system of claim 13, wherein the at least one memory further comprises instructions that, when executed by the at least one processor, further cause the computing system to:
    prior to determining the first prompt, determine a third prompt including the first natural language input data, wherein the third prompt is a third instruction to determine the one or more tasks associated with performing the action responsive to the first natural language input data;
    process, using the first language model, the third prompt to generate fourth output data indicating an ambiguity associated with the first natural language input data; and
    based on the fourth output data, determine natural language data representing a user preference, wherein:
        the user preference resolves the ambiguity, and
        the first prompt further includes the natural language data.

19. The computing system of claim 13, wherein the instructions that cause the computing system to causing the first component to perform the first function comprise further instructions that, when executed by the at least one processor, further cause the computing system to:
    generate fourth output data representing the first function and requesting authorization to perform the first function;
    receive second natural language input data corresponding to the authorization; and
    based on receiving the second natural language input data, send, to a third component, a third instruction to cause performance of the first function.

20. The computing system of claim 13, wherein the at least one memory further comprises instructions that, when executed by the at least one processor, further:
    process, using an encoder, the first natural language input data to generate an encoded natural language input data;
    identify, in a storage and based on the encoded natural language input data, second data including an encoded representation of a previous user input, a first action responsive to the previous user input, and an indication of a user satisfaction with the first action; and process, using a third component, the encoded natural language input data and the second data to determine a first score representing a semantic similarity between the encoded natural language input data and the second data, wherein receiving the first natural language input data is based on the first score.

* * * * *